(12) United States Patent
Galletta, Jr.

(10) Patent No.: US 9,084,973 B2
(45) Date of Patent: Jul. 21, 2015

(54) METHODS AND APPARATUS FOR AERATION OF LIQUID MEDIUM AND VECTORING FLOW CONTROL

(71) Applicant: Robert J. Galletta, Jr., Savannah, GA (US)

(72) Inventor: Robert J. Galletta, Jr., Savannah, GA (US)

(*) Notice: Subject to any disclaimer, the term of this patent is extended or adjusted under 35 U.S.C. 154(b) by 326 days.

(21) Appl. No.: 13/792,277

(22) Filed: Mar. 11, 2013

(65) Prior Publication Data

US 2013/0220944 A1 Aug. 29, 2013

Related U.S. Application Data

(60) Continuation-in-part of application No. 13/761,269, filed on Feb. 7, 2013, which is a continuation-in-part of application No. 12/840,017, filed on Jul. 20, 2010, now Pat. No. 8,454,000, which is a (Continued)

(51) Int. Cl.
| | | |
|---|---|---|
| *B01F 3/04* | (2006.01) | |
| *C02F 7/00* | (2006.01) | |
| *B01F 13/00* | (2006.01) | |
| *B01F 13/06* | (2006.01) | |

(Continued)

(52) U.S. Cl.
CPC ............ *B01F 3/0451* (2013.01); *B01F 3/04765* (2013.01); *B01F 13/0049* (2013.01); *B01F 13/065* (2013.01); *C02F 3/1284* (2013.01); *C02F 7/00* (2013.01); *B01F 2003/04872* (2013.01); *B01F 2215/0052* (2013.01); *C02F 3/14* (2013.01)

(58) Field of Classification Search
CPC ............... B01F 3/0451; B01F 3/04765; B01F 13/0049; B01F 13/065; B01F 2003/04872; B01F 2215/0052; C02F 3/1284; C02F 3/14; C02F 7/00
USPC .............. 261/28, 30, 34.1, 83, 84, 91, 92, 93, 261/120, DIG. 71; 210/749, 758
See application file for complete search history.

(56) References Cited

U.S. PATENT DOCUMENTS

| | | |
|---|---|---|
| 345,408 A | 7/1886 | Birge |
| 452,147 A | 5/1891 | Nuebling |
| 901,465 A | 10/1908 | Pancoast |

(Continued)

FOREIGN PATENT DOCUMENTS

| | | | |
|---|---|---|---|
| DE | 1137690 | * | 10/1962 |
| FR | 2853310 | | 4/2003 |

(Continued)

*Primary Examiner* — Charles Bushey
(74) *Attorney, Agent, or Firm* — Mathew L. Grell; Balser & Grell IP Law

(57) ABSTRACT

A method and apparatus for vectoring flow control and aeration of a liquid medium, includes a dome supported by a flotation device, a lower housing supported by said flotation device, said lower housing connected to said dome, wherein a space is defined under said dome and above the flotation liquid, an aeration apparatus positioned within said space and partially submerged in the flotation liquid, wherein said aeration apparatus comprises one or more parallel shafts, at least one first disc positioned axially on one of said shafts, at least one second disc positioned axially on another of said shafts, wherein said second disc is interleaved relative to said first disc, and wherein a surface of said first disc rotates in a direction opposite a surface of said second disc relative to each other resulting in a mixing area therebetween, and a discharge chute configured to discharge the liquid medium.

33 Claims, 24 Drawing Sheets

Related U.S. Application Data continuation-in-part of application No. 12/555,786, filed on Sep. 8, 2009, now Pat. No. 8,191,869, which is a continuation-in-part of application No. 12/464,852, filed on May 12, 2009, now Pat. No. 8,096,531, which is a continuation-in-part of application No. 12/187,905, filed on Aug. 7, 2008, now Pat. No. 7,531,097, which is a division of application No. 11/131,113, filed on May 17, 2005, now Pat. No. 7,427,058.

(51) Int. Cl.
*C02F 3/12* (2006.01)
*C02F 3/14* (2006.01)

(56) References Cited

U.S. PATENT DOCUMENTS

| | | | |
|---|---|---|---|
| 1,681,711 A | 8/1928 | Taylor | |
| 2,033,412 A | 3/1936 | Chapman | |
| 2,639,129 A | 5/1953 | Rosset | |
| 2,678,810 A | 5/1954 | Chandler | |
| 3,322,410 A | 5/1967 | Ahlenius | |
| 3,493,216 A | 2/1970 | Johnson | |
| 3,653,641 A | 4/1972 | Eron | |
| 3,669,422 A | 6/1972 | Nogaj | |
| 3,675,779 A * | 7/1972 | Grutsch et al. | 210/242.2 |
| 3,709,664 A | 1/1973 | Krekeler et al. | |
| 3,794,303 A * | 2/1974 | Hirshon | 261/61 |
| 3,871,581 A | 3/1975 | Dively | |
| 3,928,512 A | 12/1975 | Cherry | |
| 3,997,443 A | 12/1976 | Thissen | |
| 4,268,385 A * | 5/1981 | Yoshikawa | 210/150 |
| 4,382,557 A | 5/1983 | Duerr | |
| 4,409,107 A * | 10/1983 | Busch | 210/758 |
| 4,468,358 A | 8/1984 | Haegeman | |
| 4,493,557 A | 1/1985 | Nayak et al. | |
| 4,540,528 A | 9/1985 | Haegeman | |
| 4,680,148 A | 7/1987 | Arbisi et al. | |
| 4,838,704 A | 6/1989 | Carver | |
| 4,913,854 A | 4/1990 | Miyahara | |
| 5,021,154 A | 6/1991 | Haegeman | |
| 5,116,501 A | 5/1992 | House | |
| 5,196,148 A | 3/1993 | Nigrelli | |
| 5,697,704 A | 12/1997 | Coyle | |
| 5,948,326 A | 9/1999 | Pate | |
| 6,158,722 A | 12/2000 | Gigas | |
| 6,270,681 B1 | 8/2001 | Gray | |
| 6,499,727 B1 | 12/2002 | Sylvester | |
| 6,634,626 B2 | 10/2003 | Petrescu et al. | |
| 6,832,753 B1 | 12/2004 | Huang | |
| 7,427,058 B2 | 9/2008 | Galletta, Jr. | |
| 7,531,097 B2 | 5/2009 | Galletta, Jr. | |
| 8,096,531 B2 | 1/2012 | Galletta, Jr. | |
| 8,191,869 B2 | 6/2012 | Galletta, Jr. | |
| 8,454,000 B2 * | 6/2013 | Galletta, Jr. | 261/28 |
| 2004/0141851 A1 | 7/2004 | Hite | |
| 2010/0283162 A1 | 11/2010 | Galletta, Jr. | |
| 2013/0147068 A1 * | 6/2013 | Galletta, Jr. | 261/91 |
| 2013/0220940 A1 * | 8/2013 | Galletta | 210/747.6 |

FOREIGN PATENT DOCUMENTS

| | | |
|---|---|---|
| GB | 1365294 | 8/1974 |
| JP | 9052098 | 2/1997 |
| JP | 2002219480 | 8/2002 |
| RU | 2129049 | 4/1999 |

* cited by examiner

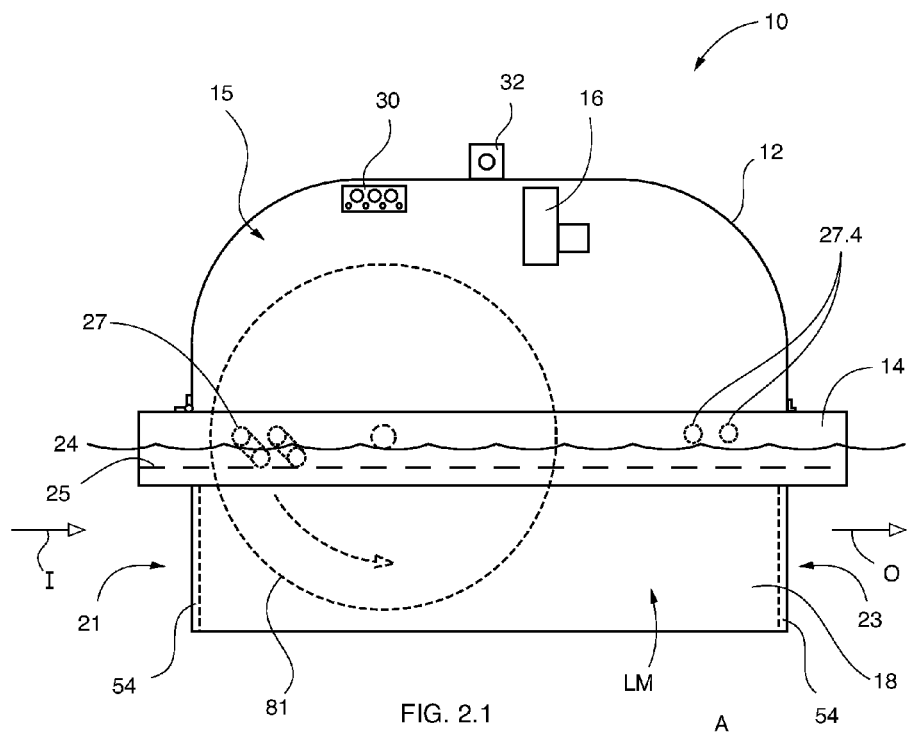
FIG. 2.1
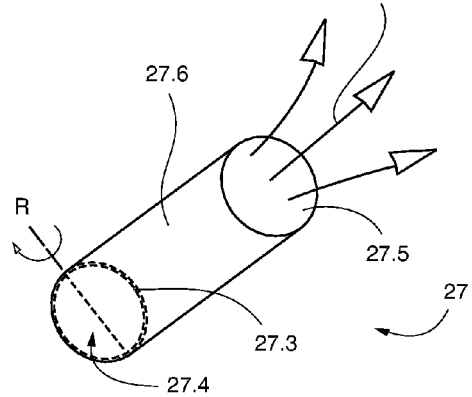
FIG. 2.1A

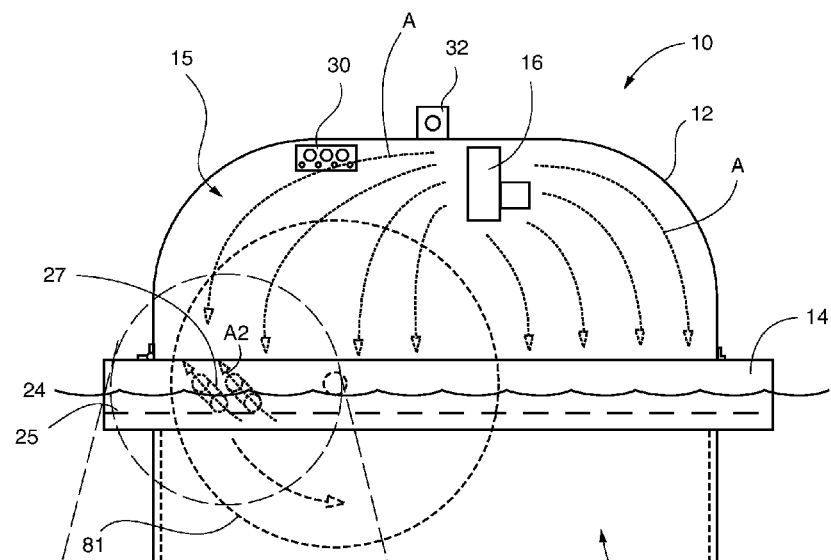
FIG. 2.2A
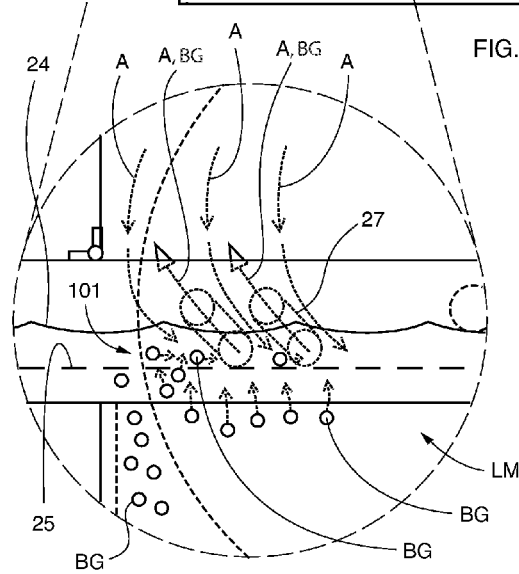
FIG. 2.2B

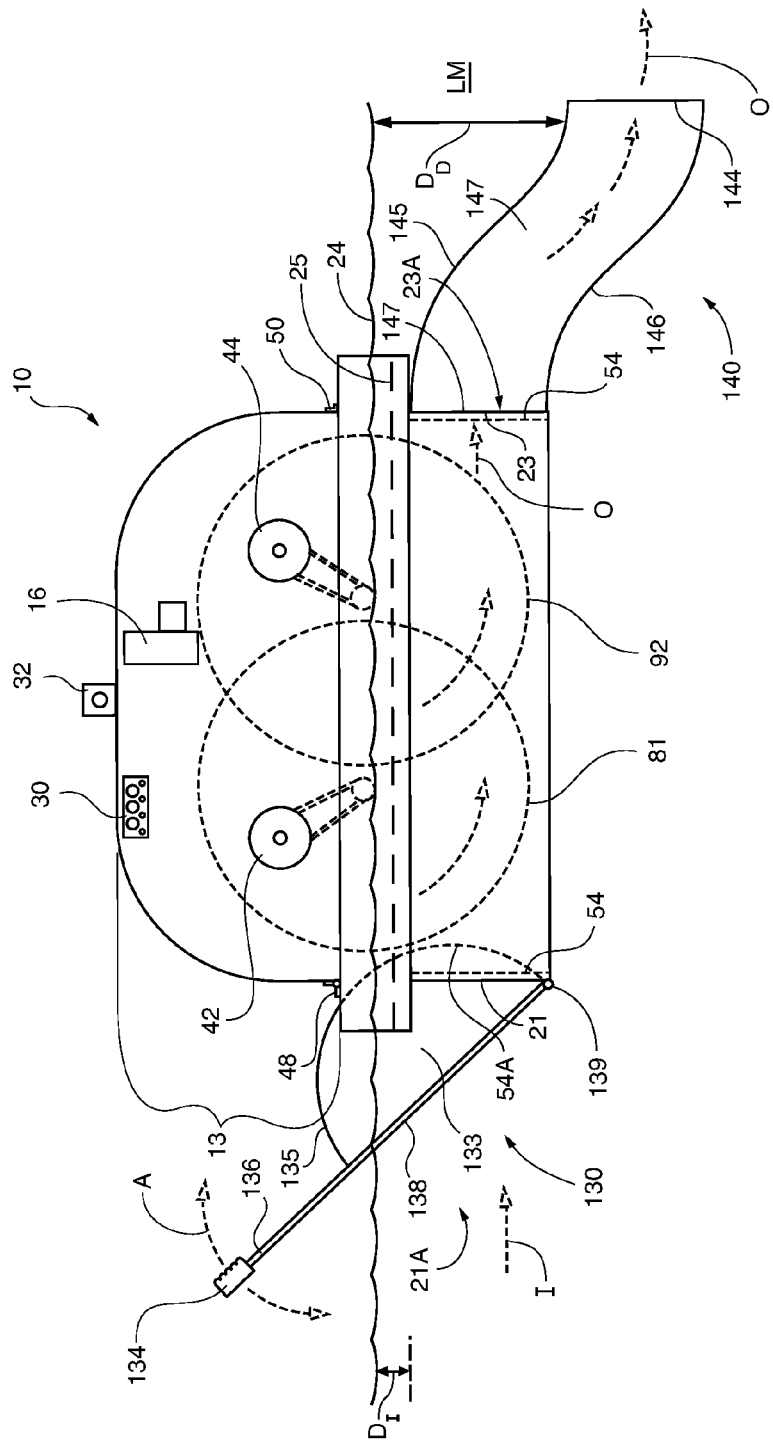
FIG. 2.3

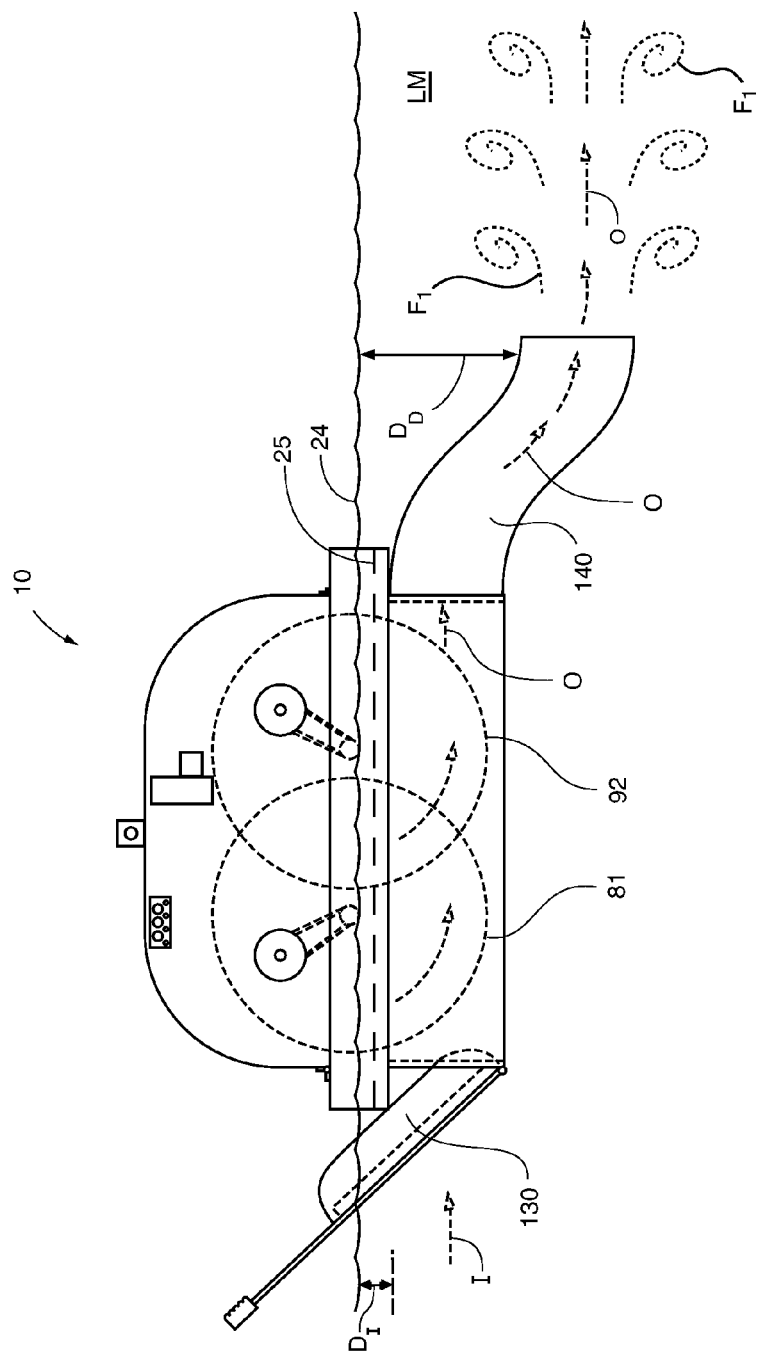
FIG. 2.4

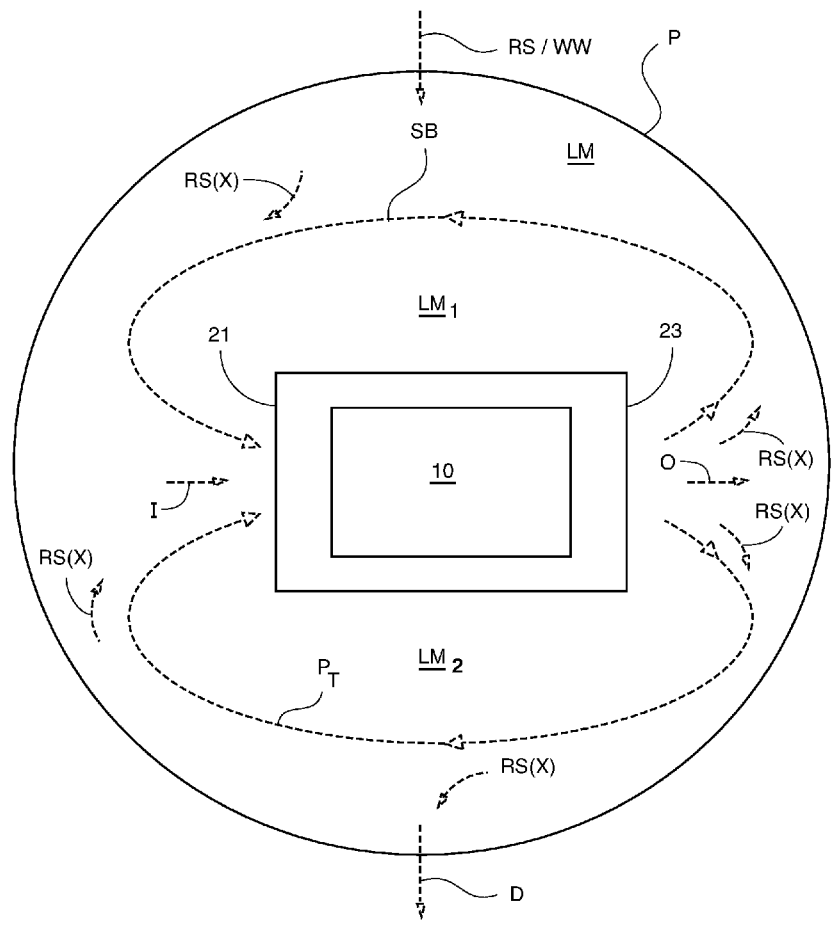
FIG. 2.5

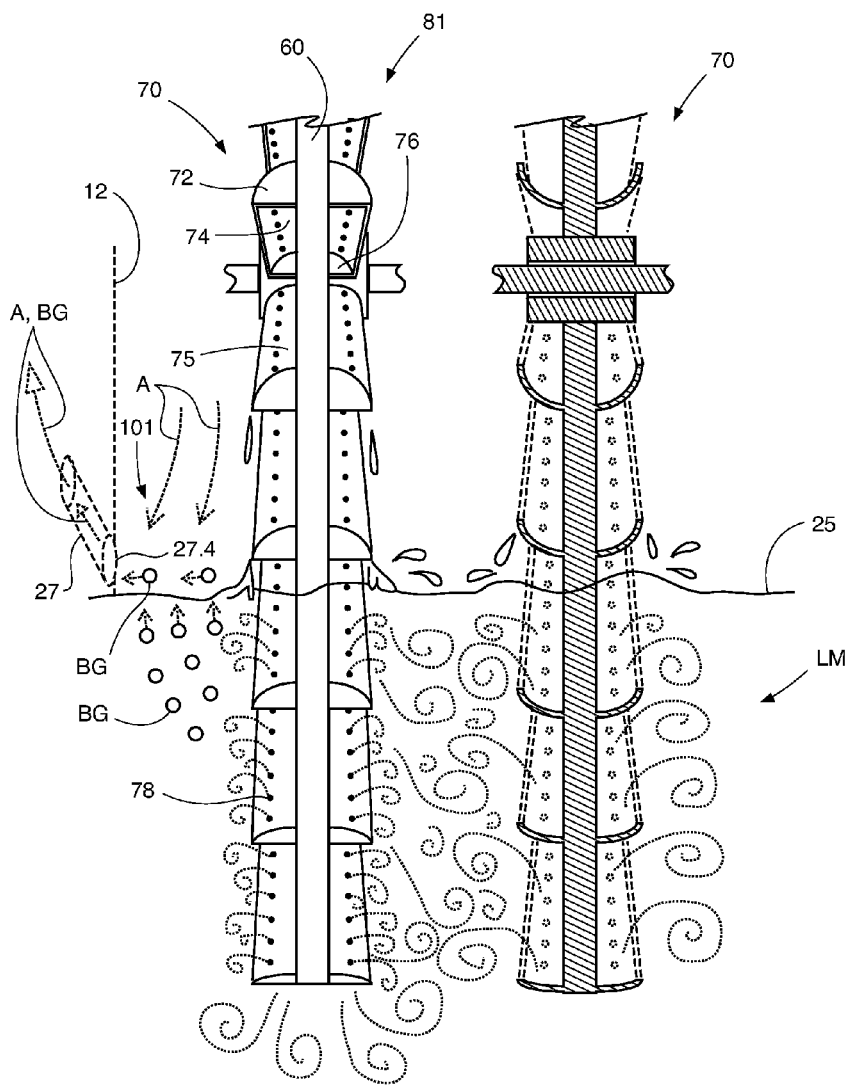
FIG. 3.1

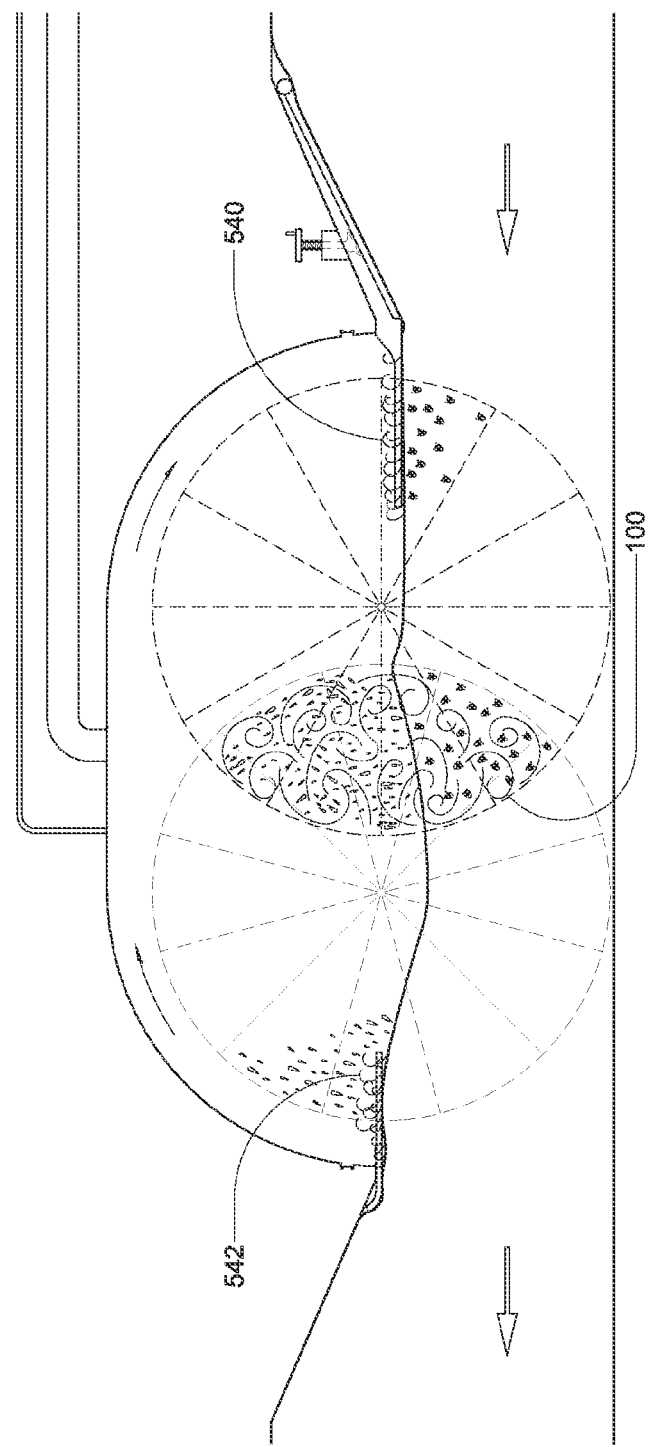

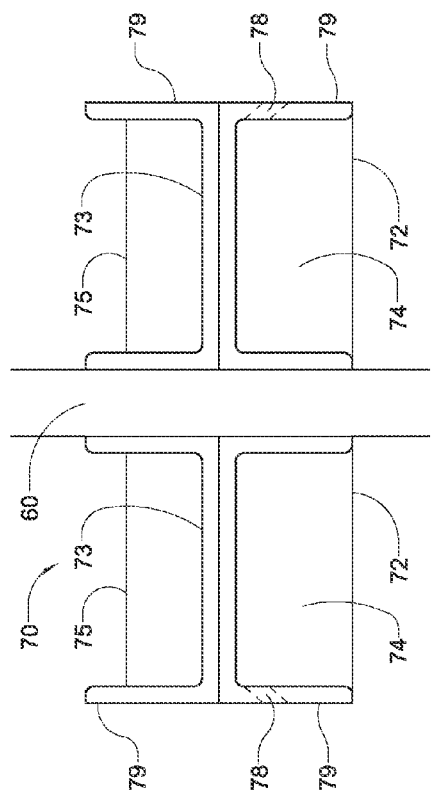
FIG. 16.1
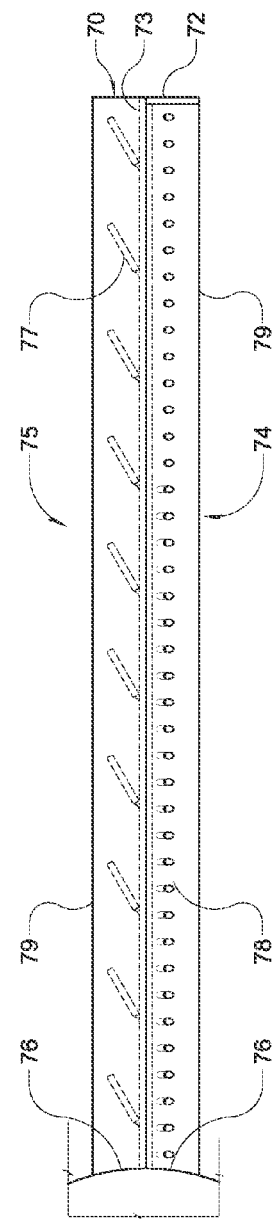
FIG. 16.2

METHODS AND APPARATUS FOR AERATION OF LIQUID MEDIUM AND VECTORING FLOW CONTROL

CROSS-REFERENCE AND PRIORITY CLAIM TO RELATED APPLICATIONS

To the fullest extent permitted by law, the present United States Non-Provisional patent application is a continuation-in-part of, and hereby claims priority to and the full benefit of U.S. Non-Provisional patent application entitled, "Controlled Scrubbing and Aeration of Liquid Medium," filed on Feb. 7, 2013, having assigned Ser. No. 13/761,269 (a continuation-in-part of application Ser. No. 12/840,017, filed on Jul. 20, 2010), which claims priority to and the full benefit of U.S. Non-Provisional patent application entitled, "Method and Apparatus for Controlled Aeration of Liquid Medium in a Pipe," filed on Jul. 20, 2010, having assigned Ser. No. 12/840,017, now U.S. Pat. No. 8,454,000, (a continuation-in-part of application Ser. No. 12/555,786, filed on Sep. 8, 2009), which claims priority to and the full benefit of U.S. Non-Provisional patent application entitled, "Method and Apparatus for Submersible or Self Contained Aeration of Liquid Medium," filed on Sep. 8, 2009, having assigned Ser. No. 12/555,786 (a continuation-in-part of application Ser. No. 12/464,852, filed on May 12, 2009) and issued under U.S. Pat. No. 8,191,869 on Jun. 5, 2012, which claims priority to and the full benefit of U.S. Non-Provisional patent application entitled, "Method and Apparatus for Aeration of Liquid Medium in a Pipe," filed on May 12, 2009, having assigned Ser. No. 12/464,852 (a continuation-in-part of application Ser. No. 12/187,905, filed on Aug. 7, 2008) and issued under U.S. Pat. No. 8,096,531 on Jan. 17, 2012, which claims priority to and the full benefit of U.S. Non-Provisional patent application entitled "Method and Apparatus for Aeration of Liquid Medium," filed on Aug. 7, 2008, having assigned Ser. No. 12/187,905 (a divisional of application Ser. No. 11/131,113, filed on May 17, 2005) and issued under U.S. Pat. No. 7,531,097 on May 12, 2009, which claims priority to and the full benefit of U.S. Non-Provisional patent application entitled "Method and Apparatus for Aeration of Liquid Medium," filed on May 17, 2005, having assigned Ser. No. 11/131,113, and issued under U.S. Pat. No. 7,427,058 on Sep. 23, 2008, incorporated herein by reference in their entirety.

TECHNICAL FIELD

This disclosure relates to an apparatus and method for mixing gas, such as air, with liquid, and more specifically the disclosure relates to aeration of wastewater, sewage and industrial waste including any body of water or liquid.

BACKGROUND

Wastewater from both municipal sewage systems and from industrial waste product exhausting systems is usually collected in large ponds, ditches, or basins that are referred to as wastewater ponds. Such ponds may be a few to several feet deep and may cover quite a number of acres of surface area. The wastewater usually includes large amounts of organic and inorganic waste material that, if left untreated, creates severe odors and can generates toxic products.

Moreover, EPA has published dissolved oxygen (DO) criteria for liquid, such as fresh, salt and brackish water, and wastewater, sewage and industrial wastewater discharges into the same bodies of water to protect organisms and their uses from the adverse effects of low DO conditions. The Agency developed these criteria because hypoxia (low dissolved oxygen) is a significant problem for lakes, streams, rivers, and coastal waters that receive a lot of runoff that contain nutrients (for example, nitrogen and phosphorous and other oxygen-demanding biological wastes). Excessive nutrients in aquatic systems stimulate algae growth, which in turn uses up the oxygen needed to maintain healthy fish, shellfish, and other aquatic life populations.

EPA's Environmental Monitoring and Assessment Program (EMAP) for lakes, streams, rivers, and coastal waters has shown areas exposed to some dissolved oxygen concentrations of less than 5 mg/L. Long periods of DO below 5 mg/L can harm larva life stages for many fish, shellfish, and other aquatic life populations.

The EPA's dissolved oxygen criteria apply to both continuous and cyclic low DO conditions. If the DO conditions are always above the chronic criterion for growth (4.8 mg/L), the aquatic life at that location should not be harmed. If the DO conditions at a site are below the juvenile/adult survival criterion (2.3 mg/L), there is not enough DO to protect aquatic life.

Under the Clean Water Act (CWA), states, territories, and tribes must adopt water quality criteria to protect designated uses. The EPA has promulgated regulations to implement this requirement including levels of DO (see 40 CFR 131).

The most common method of wastewater treatment uses an activated sludge process. This process involves three major steps. The primary treatment stage consists of a simple separation between dense sludge, which is sent to an incinerator or land fill, and the remaining effluent liquid sludge then undergoes secondary treatment. Secondary treatment is where the biochemical consumption of organic material takes place. The microorganisms present in the liquid sludge feast on the biomass in the wastewater pond. Extensive aeration is needed for the bacteria to consume the organic wastes.

The third phase of treatment can be simple or extensive depending upon the extent of pollution and the requirements for water purity. Its purpose is to remove inorganic pollutants as well as any organic mass not removed by the primary and secondary stages. Lastly, the treated water is discharged back into the environment. This discharge must meet federal, state, county and city government standards for discharged water, such as minimum dissolved oxygen levels deemed necessary to accommodate marine life, before such wastewater can be discharged into a river or stream.

The activated sludge process is a biochemical process in which aerobic bacteria consume the organic pollutants in wastewater. Because the bacteria are aerobic, their efficiency of consumption is very dependent upon the amount of available oxygen dissolved in the liquid sludge. In the wastewater treatment process, aeration introduces air into a liquid, providing an aerobic environment for microbial degradation of organic matter. The purpose of aeration is two-fold: to supply the required oxygen to the metabolizing microorganisms and to provide mixing so that the microorganisms come into intimate contact with the dissolved and suspended organic matter.

Various aeration approaches have been used; the two most common aeration systems are subsurface and mechanical. In subsurface aeration systems, air or oxygen is pumped below the surface to a diffuser or other device submerged in the wastewater. Fine pore diffusion is a subsurface form of aeration in which air is introduced in the form of very small bubbles into the wastewater pond. One type of an oxygen diffuser for wastewater treatment process requires constant movement of the diffuser to different levels and positions within the wastewater pond and performs minimal mixing of the wastewater and oxygen. In addition, un-reacted air or oxygen bubbles make their way to the surface and do not become dissolved in the liquid. If oxygen is the source, then the oxygen that makes it to the surface of the wastewater pond is wasted as it vents to the air above the pond.

Mechanical aeration and mixing systems take on various forms, such as downdraft pumps, which force surface water to the bottom, updraft pumps, which produce a small fountain, and paddle wheels, which increase the surface area of the water. In addition, all such devices mix wastewater by moving large amounts of heavy water or hurling it into the air resulting in high energy consumption for these devices. Some such devices generate large amounts of odor and foam while agitating the wastewater and consume large amounts of electrical power resulting in high electricity cost for operation.

Moreover, testing of aeration of liquid in the field revealed that as liquid temperature rose the ability to dissolve oxygen into the incoming liquid was being greatly reduced. This is a chronic problem with virtually all types of aeration devices. While it is true that water has less capacity to hold gas or solids in suspension when warm, the significant drop in the efficiency of all aeration operations in the summer months could not all be attributed to this phenomenon. It became evident that under conditions commonly encountered in many of the applications where aeration is required, applications such as wastewater treatment and environmental remediation, the liquid to be treated could contain unusually high concentrations of unwanted gasses or bad gas. This condition of saturated or super saturation of carbon dioxide, methane, hydrogen sulfide is usually caused by biological loading (decaying organic matter) as well as other types of pollution such as nitrification of the liquid.

Therefore, it is readily apparent that there is a need for an economical apparatus and methods for vectoring flow control and aeration of wastewater, sewage and industrial waste, or other liquids, such as fresh, salt and brackish water, and more particularly, a process for efficiently adding dissolved oxygen into such liquids.

BRIEF SUMMARY

Briefly described, in an example embodiment, the present disclosure overcomes the above-mentioned disadvantages and meets the recognized need for such a device by providing a method and apparatus for vectoring flow control and aeration of a liquid medium, in general comprises a dome supported by a flotation device, a lower housing supported by said flotation device, said lower housing connected to said dome, wherein a space is defined under said dome and above the flotation liquid, an aeration apparatus positioned within said space and partially submerged in the flotation liquid, wherein said aeration apparatus comprises one or more parallel shafts, at least one first disc positioned axially on one of said shafts, at least one second disc positioned axially on another of said shafts, wherein said second disc is interleaved relative to said first disc, and wherein a surface of said first disc rotates in a direction opposite a surface of said second disc relative to each other resulting in a mixing area therebetween, and a discharge chute configured to discharge the liquid medium, and thus, efficiently mixing liquid medium and adding dissolved oxygen into such liquid medium.

According to its major aspects and broadly stated, the present disclosure in its example form is a pressurized dome aerator device and process for adding dissolved oxygen into liquid, such as fresh, salt and brackish water, wastewater, sewage and industrial wastewater in motion in a pipe or closed receptacle.

More specifically, the aerator device has two or more partially submerged interleaved sets of discs operating in rotational unison along parallel shafts driven by variable speed drives. One or more strakes with end caps are mounted on the discs in radial fashion, extending from the hub to the edge of the disc. The strakes on one disc bring the liquid up to the liquid line and the strakes on the other disc bring the air down to the liquid line and in close contact with each other in a mixing area just below the liquid line. This force mixes the oxygen from the air into the oxygen-depleted liquid, thus increasing the dissolved oxygen content of the liquid, such as fresh, salt and brackish water, wastewater, sewage and industrial waste.

Still more specifically, an example embodiment of an apparatus and method for controlled scrubbing and aeration of a liquid medium comprises a method of mixing liquid, comprising the steps of obtaining an apparatus comprising a dome, blower, orifice in the dome, leading disc, trailing disc, and at least two strakes, wherein the first strake is carried by the leading disc and the second strake is carried by the trailing disc, extracting gas from the liquid when the leading disc strikes the liquid, and wherein the blower evacuates the extracted gas via the orifice in the dome, trapping liquid between the discs in a mixing area, forcing the gas depleted liquid up into the mixing area by the first strake, and forcing gas within the dome down into the mixing area by the second strake, and creating a shear force between the gas and the gas depleted liquid therein the mixing area to increase the dissolved gas in the liquid.

Still more specifically, an example embodiment of an apparatus and method for mixing gas and liquid comprises a pipe or closed receptacle having an enclosure positioned in-line with the pipe or closed receptacle, wherein a sealed space is defined, at least one blower, the blower regulates the barometric pressure in the sealed space, wherein intermeshed rotating sets of discs operate on parallel shafts driven by variable speed drives, and strakes are radially mounted on the discs to carry liquid up into a mixing area and to carry air and liquid down into a mixing area resulting in a shear force that drives air into the oxygen depleted liquid. In the sealed space the barometric pressure is raised by a blower to at or above the pressure of liquid entering the sealed space, in order to pop foam bubbles and allow for optimum mixing of air into the oxygen depleted liquid and to regulate the liquid line within the sealed space, thereby preventing the escape of foam, noise and odorous gases into the local environment.

Another example embodiment of an apparatus and method for mixing gas and liquid comprising a submersible pressurized dome aeration apparatus housing multi-shaft intermeshed plurality of mixing discs with a remote umbilical power and control unit and process for adding dissolved gas (oxygen) into fluid (water).

Another example embodiment of an apparatus and method for mixing gas and liquid comprising a self contained floating pressurized dome aeration apparatus housing multi-shaft intermeshed plurality of mixing discs and process for adding dissolved gas (oxygen) into fluid (water).

Another example embodiment of the controlled aeration of liquid medium in a pipe or closed receptacle is an apparatus for treating liquid by exposing the liquid to gas, the apparatus having: a pipe having an enclosure positioned in-line with the pipe, wherein a sealed space is defined in the enclosure, an aeration apparatus positioned within the sealed space and partially submerged in the liquid medium flowing from the pipe and the enclosure, wherein the aeration apparatus comprises one or more parallel shafts, at least one first disc positioned axially on one of the shafts, at least one second disc positioned axially on another of the shafts, wherein the second disc is interleaved relative to the first disc, and wherein a surface of the first disc rotates in a direction opposite a surface of the second disc relative to each other resulting in a mixing area there between, a plurality of discs, the plurality of discs having two or more the first disc and two or more the second disc, at least one disc wipe positioned between the plurality of discs, and at least one blower, the blower disposed in a position enabling an effect there from on the barometric pressure in the sealed space.

Another example embodiment of the controlled aeration of liquid medium in a pipe or closed receptacle is an apparatus for treating liquid by exposing the liquid to gas, the apparatus having: a pipe having an enclosure positioned in-line with the pipe, wherein a sealed space is defined in the enclosure, an aeration apparatus positioned within the sealed space and partially submerged in the liquid medium flowing from the pipe and the enclosure, wherein the aeration apparatus comprises one or more parallel shafts, at least one first disc positioned axially on one of the shafts, at least one second disc positioned axially on another of the shafts, wherein the second disc is interleaved relative to the first disc, and wherein a surface of the first disc rotates in a direction opposite a surface of the second disc relative to each other resulting in a mixing area there between, a nozzle positioned approximate the enclosure to alter an angle of the liquid medium flowing from the pipe to the enclosure, and at least one blower, the blower disposed in a position enabling an effect there from on the barometric pressure in the sealed space.

Another example embodiment of the apparatus for controlled ventilation and aeration of a liquid medium, the apparatus includes a dome supported by a flotation device, a lower housing supported by said flotation device, said lower housing connected to said dome, wherein a sealed space is defined under said dome and above the flotation liquid, an aeration apparatus positioned within said sealed space and partially submerged in the flotation liquid, wherein said aeration apparatus comprises one or more parallel shafts, at least one first disc positioned axially on one of said shafts, at least one second disc positioned axially on another of said shafts, wherein said second disc is interleaved relative to said first disc, and wherein a surface of said first disc rotates in a direction opposite a surface of said second disc relative to each other resulting in a mixing area therebetween, and a discharge chute configured to discharge the liquid medium.

Another example embodiment of the system for mixing a liquid medium, the system includes an aerator device having a dome supported by a flotation device, a lower housing supported by said flotation device, said lower housing connected to said dome, wherein a sealed space is defined under said dome and above the flotation liquid, an aeration apparatus positioned within said sealed space and partially submerged in the flotation liquid, wherein said aeration apparatus comprises one or more parallel shafts, at least one first disc positioned axially on one of said shafts, at least one second disc positioned axially on another of said shafts, wherein said second disc is interleaved relative to said first disc, and wherein a surface of said first disc rotates in a direction opposite a surface of said second disc relative to each other resulting in a mixing area therebetween, an intake configured to intake the liquid medium, and a discharge configured to discharge the liquid medium, an in flow of the liquid medium into said intake, an out flow of the liquid medium from said discharge, and wherein said out flow from said aerator device is configured as a plurality of flow vectors originating at said discharge and returning to said intake.

Still more specifically, an example embodiment of an apparatus and method of mixing and aerating a liquid medium, including the steps of obtaining an aerator device having a dome supported by a flotation device, a lower housing supported by said flotation device, said lower housing connected to said dome, wherein a sealed space is defined under said dome and above the flotation liquid, an aeration apparatus positioned within said sealed space and partially submerged in the flotation liquid, wherein said aeration apparatus comprises one or more parallel shafts, at least one first disc positioned axially on one of said shafts, at least one second disc positioned axially on another of said shafts, wherein said second disc is interleaved relative to said first disc, and wherein a surface of said first disc rotates in a direction opposite a surface of said second disc relative to each other resulting in a mixing area therebetween, an intake configured to intake the liquid medium, and a discharge chute configured to discharge the liquid at a depth below said intake, an in flow of the liquid medium into said intake of said aerator device, an out flow of the liquid medium from said discharge of said aerator device, and wherein said out flow from said aerator device is configured as a plurality of flow vectors originating at said discharge and returning to said intake, mixing operating said aerator device in the liquid medium, generating said out flow and said in flow configured as a torus shape, mixing different vertical layers of the liquid medium, and mixing different horizontal layers of the liquid medium.

Accordingly, a feature of the apparatus and method for mixing gas and liquid is its ability to create a shear force between the liquid on the leading edge of opposing strakes within the mixing area to efficiently mix the gas and the liquid.

In addition, the strakes have bleed holes on their trailing face. The end caps force liquid fluid eddy currents on the liquid side and flurries of bubbles of air on the gas side through the bleed holes of the trailing edge of the strake into the mixing area to efficiently mix the air and liquid, such as fresh, salt and brackish water, wastewater, sewage and industrial waste.

Accordingly, a feature of the apparatus and method for mixing gas and liquid is its ability to sustain a larger number of aerobic dependent bacteria than traditional methods resulting in an increased biochemical consumption of organic material in the liquid or wastewater pond.

In use, the aerator device is placed on a floating platform to keep the aerator device at a set position relative to the liquid line. The floating apparatus is covered with an airtight cover or dome, wherein the barometric pressure is raised under the cover or dome by an air blower to create an atmosphere under the dome with an increased barometric pressure.

Another feature of the apparatus and method for mixing gas and liquid is that the variable barometric pressure allows for optimum atmospheric dissolution under the cover or dome.

Another feature of the apparatus and method for mixing gas and liquid is that the foam must travel back beneath the liquid-line of the liquid to escape the floating apparatus resulting in further aeration of the liquid sludge.

Another feature of the apparatus and method for mixing gas and liquid is that the liquid inlet is beneath the liquid-line creating a sealed environment.

Another feature of the apparatus and method for mixing gas and liquid is that the liquid discharge is beneath the liquid-line creating a sealed environment.

Another feature of the apparatus and method for mixing gas and liquid is its ability to minimize foam generated during use, wherein the raised barometric pressure in the dome serves the function of popping the bubbles created by the mechanical mixer.

Another feature of the apparatus and method for mixing gas and liquid is that the cover or dome traps odorous gases preventing their escape into the local environment, resulting in an odor free operation.

Another feature of the apparatus and method for mixing gas and liquid is that the cover or dome traps the noises generated by the mechanical agitation preventing their escape into the local environment and resulting in an essentially noise free operation.

Another feature of the apparatus and method for mixing gas and liquid is that the strakes may be configured to provide a cutting or chopping action or edge for operation in high solid and/or high fiber, such as hair and bio solids, prevailing in primary wastewater sludge ponds.

Another feature of the in line pipe apparatus and method for mixing gas and liquid is its ability to utilize energy gathering rotors' operating passively with drive system disengaged if pipe current is adequate to drive the apparatus.

Another feature of the submerged apparatus and method for mixing gas and liquid is its ability to operate at any depth limited only by length of connecting umbilical and the availability of supply pressure to overcome water pressure at operating depth.

Another feature of the submerged apparatus and method for mixing gas and liquid is its ability to utilize the efficiencies of Henry's Law and dissolves gas at depth under great pressure, where increased oxygen is retained in liquid due to the higher pressure.

Another feature of the submerged apparatus and method for mixing gas and liquid is its ability to operate continuously in any weather, and is not affected by surface conditions.

Another feature of the submerged apparatus and method for mixing gas and liquid is its ability to recover from loss of power and air pressure without retrieval by reapplying air pressure; resulting in an air pocket under the dome of the submerged unit.

Another feature of the submerged apparatus and method for mixing gas and liquid is its ability to be retrieved from its submerged position by routing compressed air to ballast tanks and adding buoyancy to the unit.

Another feature of the submerged apparatus and method for mixing gas and liquid is its ability to hide the remote power and control unit, especially in aesthetically or environmentally sensitive areas such as developed water front or wildlife habitat as well as by adding a sound attenuated housing or positioning the power unit inside a building or mechanical room.

Another feature of the submerged apparatus and method for mixing gas and liquid is its ability to position the power and control unit on a barge or other vessel, which may be used as a tender for submerged unit, retrieving, servicing or relocating both power and submerged unit as necessary.

Another feature of the submerged apparatus and method for mixing gas and liquid is its ability to utilize energy gathering rotors, provided water movement relative to the submerged unit is sufficient for passive power operation.

Another feature of the submerged apparatus and method for mixing gas and liquid is its ability to operate at the very bottom of a shipping channel where the submerged unit is anchored causing no delay to passing ship traffic.

Another feature of the submerged apparatus and method for mixing gas and liquid is its ability to be virtually invisible to public, while being of vital service to the environment, industry, and commerce.

Another feature of the submerged apparatus and method for mixing gas and liquid is its ability to utilize energy gathering rotors' operating passively with drive system disengaged if current is strong or unit is being towed.

Still more specifically, an apparatus for treating fluid by exposing the fluid to gas, the apparatus including a dome, a lower housing supports the dome, the lower housing connected to the dome, wherein a sealed space is defined under the dome and above a fluid line within the lower housing, an aeration apparatus positioned within the sealed space and partially submerged below the fluid line, wherein the aeration apparatus comprises one or more parallel shafts, at least one first disc positioned axially on one of the shafts, at least one second disc positioned axially on another of the shafts, wherein the second disc is interleaved relative to the first disc, and wherein a surface of the first disc rotates in a direction opposite a surface of the second disc relative to each other resulting in a mixing area therebetween; at least one air source, the air source enabling an effect therefrom on the barometric pressure in the sealed space, and wherein the apparatus is submerged to depths having increased pressure below a liquid line.

Another feature of the self contained apparatus and method for mixing gas and liquid is its portability enabling quick re-positioning in an existing body of water and mobility from one aquatic area to another. No infrastructure of any kind needed to operate the apparatus other than a fuel supply.

Another feature of the self contained apparatus and method for mixing gas and liquid is its ability to scale to any size with current technology and materials, whether as a small craft or a large barge.

Another feature of the self contained apparatus and method for mixing gas and liquid is its ability to operate autonomously utilizing currently available technology and utilizing global positioning and the like.

Another feature of the self contained apparatus and method for mixing gas and liquid is its ability to have an operator on board to function in complex patterns like a street sweeper.

Another feature of the self contained apparatus and method for mixing gas and liquid is its setup and retrieval time are reduced to minutes not hours or days, since it is equipped with fuel and a power supply.

Another feature of the self contained apparatus and method for mixing gas and liquid is its ability to operate without being tethered, power or control cables, guides or other devices.

Another feature of the self contained apparatus and method for mixing gas and liquid is its ability to be instantly deployable or air lifted in a crises situation, such as low dissolved oxygen conditions at a fish farm, sewage spills, and algae blooms, i.e., anywhere oxygen needs to be restored quickly.

Another feature of the self contained apparatus and method for mixing gas and liquid is its ability to add a cutter head to the apparatus to eradicate, remove, or harvest algae or other aquatic plant growth.

Another feature of the self contained apparatus and method for mixing gas and liquid is its ability to utilize energy gathering rotors' operating passively with drive system disengaged if current is strong or unit is being towed.

Another feature of the self contained apparatus and method for mixing gas and liquid is its ability to be tethered and operate as a self contained stationary unit.

Another feature of the controlled aeration of liquid medium in a pipe or closed receptacle is its ability to provide leading and trailing disc wipes to maximize pull of liquid flow from the pipe into the mixing area and to maximize liquid flow from the mixing area back into the pipe.

Another feature of the controlled aeration of liquid medium in a pipe or closed receptacle is its ability to provide a leading liquid flow adjustable nozzle plate to direct the angle of liquid flow in a direction that aids in the rotation of the leading rotor optimizing the capture of energy from the liquid flow, to flatten or optimize the shape of the liquid medium, to add velocity to the liquid medium, and to optimize the shape and direction of the liquid medium.

Another feature of the controlled aeration of liquid medium in a pipe is its ability to provide a strake having input pipe fluid force capture principles.

Another feature of the controlled ventilation and aeration of liquid medium is its ability to provide vents formed in the dome or machine housing configured to enable air and unwanted gas to exit the dome.

Another feature of the controlled ventilation and aeration of liquid medium is its ability to provide vent tubes configured to enable air and unwanted gas to exit the dome above an external liquid line of the liquid medium.

Another feature of the controlled ventilation and aeration of liquid medium is its ability to provide a scrubbing area configured to release or scrub the dissolved or suspended unwanted or waste gases in the liquid medium to make room for liquid medium to intake additional oxygen $O_2$ in the mixing area.

Another feature of the controlled ventilation and aeration of liquid medium is its ability to cause the release or scrubbing of dissolved or suspended unwanted gases in liquid medium, such as carbon dioxide $CO_2$, hydrogen H, methane $CH_4$, hydrogen sulfide, and the like.

Another feature of the controlled ventilation and aeration of liquid medium is its ability to provide a blower and its flow of air to sweep or carry waste gases to orifice and/or vent tube configured to vent or purge air and unwanted gases from the interior space under dome.

Another feature of the controlled ventilation and aeration of liquid medium is its ability to increase the efficiency of intake of gas, such as oxygen $O_2$ (dissolved oxygen) in liquid medium.

Another feature of the controlled ventilation and aeration of liquid medium is its ability to provide for the constant exchange of the pressurized atmosphere inside the aerator dome by providing an array of vents, the vents are regulated in flow capacity and strategically placed or disposed around the dome. These vents allow for the release or "purging" of waste gases that would otherwise be trapped inside the aerator, while still maintaining the desired hyperbaric (pressurized) condition under the aerator dome.

Still more specifically, an apparatus for treating fluid by exposing the fluid to gas, the apparatus including a dome, a lower housing supports the dome, the lower housing connected to the dome, wherein a sealed space is defined under the dome and above a fluid line within the lower housing, an aeration apparatus positioned within the sealed space and partially submerged below the fluid line, wherein the aeration apparatus comprises one or more parallel shafts, at least one first disc positioned axially on one of the shafts, at least one second disc positioned axially on another of the shafts, wherein the second disc is interleaved relative to the first disc, and wherein a surface of the first disc rotates in a direction opposite a surface of the second disc relative to each other resulting in a mixing area therebetween; at least one air source, the air source enabling an effect therefrom on the barometric pressure in the sealed space, and wherein a flotation hull for channeling fluid into the sealed space and for storage fuel therein.

Another feature of the methods and apparatus for aeration of liquid medium and vectoring flow control is its ability to provide a discharge chute to manage the liquid flowing into, and out of, the aerator.

Another feature of the methods and apparatus for aeration of liquid medium and vectoring flow control is its ability to provide an aerator with the ability to pump very large volumes of liquid medium therethrough while using much less energy or power than conventional aerators.

Another feature of the methods and apparatus for aeration of liquid medium and vectoring flow control is its ability to dissolve air or oxygen into water.

Another feature of the methods and apparatus for aeration of liquid medium and vectoring flow control is its ability to perform tasks, such as, but not limited to, irrigating coral reefs to regrow coral, oil spill cleanup, mitigating fish kills, aquaculture (fish farming), redirecting migratory patterns of aquatic species, and waste-water treatment.

Another feature of the methods and apparatus for aeration of liquid medium and vectoring flow control is its ability to generate a large soft, non-disturbing stream of oxygenated liquid medium discharged or exiting the aerator.

Another feature of the methods and apparatus for aeration of liquid medium and vectoring flow control is its ability to intake liquid medium at on depth or strata of the liquid medium and discharge liquid medium at on depth or strata of the liquid medium resulting in the ability to mix horizontal layers or strata of the liquid medium.

Another feature of the methods and apparatus for aeration of liquid medium and vectoring flow control is its ability to discharge liquid medium in a pattern of flow that resembles the shape or configuration of a magnetic field or torus with the aerator in the center like the magnet.

Another feature of the methods and apparatus for aeration of liquid medium and vectoring flow control is its ability to convert a single body of water or liquid medium into a rudimentary but highly effective wastewater treatment facility.

Another feature of the methods and apparatus for aeration of liquid medium and vectoring flow control is its ability to generate two large counter rotating bodies of water or liquid medium in a single body of water or liquid medium.

Another feature of the methods and apparatus for aeration of liquid medium and vectoring flow control is its ability to utilize a single basin or lagoon, such as a pond, with a fraction of the mechanical infrastructure and energy or power requirements of traditional technologies—utilize separate basins, pumps, fabricated flow channels, piping, air compressors, more pumps, more basins, clarifiers, and a host of other equipment. These traditional technologies and processes have proven to be extremely costly in both land, buildings, manpower, equipment and energy.

Another feature of the methods and apparatus for aeration of liquid medium and vectoring flow control is its ability to harnessing the outflow of the aeration device for use as a mixing apparatus for ponds, basins, or lagoons.

Another feature of the methods and apparatus for aeration of liquid medium and vectoring flow control is its ability to harnessing the outflow of the aeration device for use as an irrigation medium.

Another feature of the methods and apparatus for aeration of liquid medium and vectoring flow control is its ability to enable inlet water to be acquired at one strata (level) and discharge outlet water to be released or discharged at another strata (level). This is very valuable especially when water temperatures may vary in a single basin.

Another feature of the methods and apparatus for aeration of liquid medium and vectoring flow control is its ability to enable use in different size, shape and depth of basins by directing the outflow angle to reach different depths.

These and other features of the methods and apparatus for aeration of liquid medium and vectoring flow control will become more apparent to one skilled in the art from the following Brief Description of the Drawings, Detailed Description of the Preferred and Selected Alternate Embodiments and Claims when read in light of the accompanying drawing Figures.

BRIEF DESCRIPTION OF THE DRAWINGS

The present methods and apparatus for aeration of liquid medium and vectoring flow control will be better understood by reading the Detailed Description of the Preferred and Selected Alternate Embodiments with reference to the accompanying drawing Figures, in which like reference numerals denote similar structure and refer to like elements throughout, and in which:

FIG. 2.1/A is a front view of the aeration apparatus of FIG. 1 with ventilation;

FIG. 2.2A/B is a front view and sectional cross-sectional view of the aeration apparatus of FIG. 2.1.

FIG. 2.3 is a front view of the aeration apparatus of FIG. 1 with angled intake screen and vector discharge chute;

FIG. 2.4 is a front view of the aeration apparatus of FIG. 1 with angled intake screen and vector discharge chute, shown in use;

FIG. 2.5 is a top view of the aeration apparatus of FIG. 1 with angled intake screen and vector discharge chute, operating in liquid medium;

FIG. 3.1 is an enlarged partial sectional view depicting the dynamics of the liquid gas scrubbing and mixing area, showing radial strakes and bleed holes according to an example embodiment of FIG. 2.2;

FIG. 15 is a cross sectional of the pipe or closed receptacle and enclosure in FIG. 14 displaying the hydrodynamics including input and exit swells and dynamics of the liquid gas mixing area;

FIG. 16.1 is a partial end view of an alternate radial strake with bleed holes according to another example embodiment;

FIG. 16.2 is a partial side view of a radial strake with bleed holes according to another example embodiment;

DETAILED DESCRIPTION

In describing embodiments of an apparatus and method for mixing gas and liquid, as illustrated in FIGS. 1-19, specific terminology is employed for the sake of clarity.

The disclosure, however, is not intended to be limited to the specific terminology so selected, and it is to be understood that each specific element includes all technical equivalents that operate in a similar manner to accomplish similar functions.

Referring now to FIGS. 1-19, there is illustrated a floating pressurized dome aerator device and process for adding dissolved gas, such as oxygen, into liquid, such as fresh, salt and brackish water, wastewater, sewage and industrial waste. It is important to understand that the apparatus and method for mixing gas and liquid is suitable for utilization in any liquid environment where an increase in dissolved air or gas into liquid medium is desired or beneficial; therefore, while the apparatus and method for mixing gas and liquid is described conveniently with the example utilization in a wastewater pond, it is not limited to application or implementation in such wastewater pond. Furthermore, the apparatus and method for mixing gas and liquid may be utilized in water such as but not limited to a golf course pond, water with aquatic plants, as well as water with fish and/or other marine life, fresh, salt or brackish water, wastewater, sewage or industrial waste. The apparatus and method for mixing gas and liquid is suitable for many applications where air or other gas is to be dissolved into a liquid or liquid medium, including but not limited to golf course ponds, oxygen depleted lakes, streams, and rivers as well as environmental and/or industrial processes.

Figure 1:
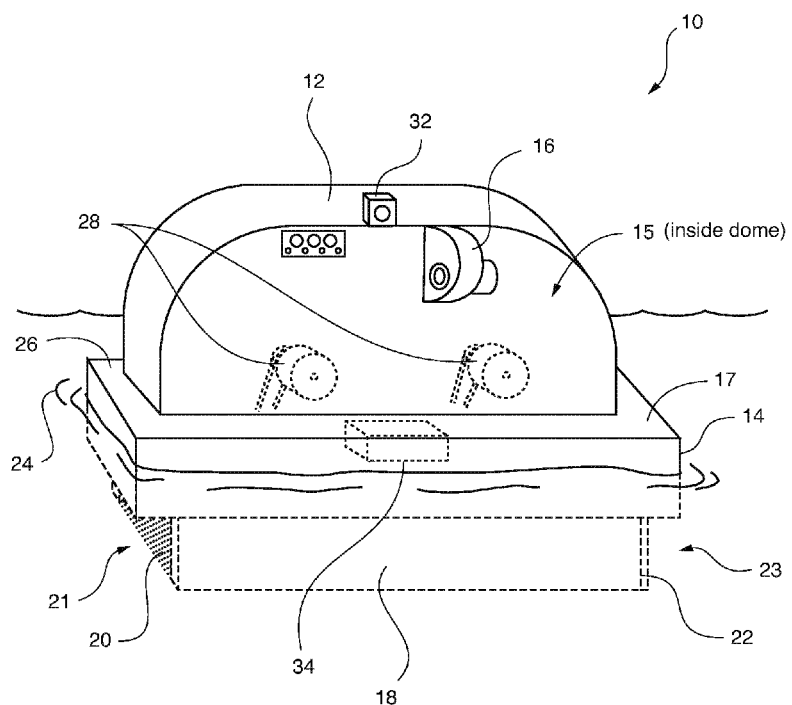
FIG. 1 is a cross-sectional illustration of the aeration apparatus according to an example embodiment.

Referring now to FIG. 1, there is illustrated a fully enclosed floating dome aerator device 10. Aerator device 10 is a mechanical gas dissolving apparatus operating in a controlled pressurized environment. Dome 12 is preferably supported by flotation device 14 proximate liquid line 24 of a pond or wastewater, sewage, industrial waste pond or other selected liquid treatment reservoir including such as fresh, salt and brackish water, wastewater, sewage and industrial waste. Dome 12 includes top portion 13 preferably positioned above the surface of the pond, so as to define a space or compartmental enclosure 15 for containing mechanical aggitation of aerator device 10. Dome is preferably constructed of an airtight and corrosion resistant material such as fiberglass or metal. It is recognized that other suitable materials could be utilized without departing from the intended scope of the present invetion. That is, dome 12 may be constructed of any material capable of holding the area defined by space or compartmental enclosure 15 under the dome at a selected, preferably increased barometric pressure.

Compartmental enclosure defined by dome 12 creates a space above the liquid line 24 that can collect foam and odor generated by aerator device 10. Foam generated by aerator device 10 is thus held in close proximity to aerator device 10 and must travel back beneath liquid line 24 to escape, further enhancing the transfer of gas to the liquid. Odorous gases generated by the mechanical agitation of aerator device 10 are also trapped in dome 12 preventing their escape into the surrounding environment resulting in an essentially odor free operation. In addition, dome 12 acts as a sound barrier, trapping the noises generated by the mechanical agitation of aerator device 10, preventing their escape into the surrounding environment, and thereby resulting in an essentially noiseless operation.

Air source, such as blower 16, is preferably any common industrial variable speed rotary type blower. Blower 16 can be of any standard design with air flow and pressure ratings capable of increasing the barometric pressure of the air under dome 12 to preferably between approximately 35-40 inches of mercury or 1-3 psi, however, greater barometric pressure can be utilized depending on the gas and liquid medium being mixed. Blower 16 is preferably rotary, but can be any fan, centrifugal, rotary or any other type of blower or air source. Blower 16 is preferably a single unit positioned proximate top portion 13; however, blower 16 can be in the form of a single or multiple blowers and can be located anywhere on aerator device 10 that permits air flow access to interior space 15 under dome 12. In the example operation, blower 16 increases the barometric pressure under dome 12 creating an ideal environment for the transfer of gas to the liquid under dome 12, wherein coincidentally surface area is increased via agitation and whirling of liquid by aerator device 10. In addition, the increase in barometric pressure under dome 12 assists with popping the foam bubbles, effectively reducing the foam generated by aerator device 10.

Blower 16 can preferably be used for facilitating fine adjustment of the position of the mechanical agitators of aerator device 10 relative to the pond level 24. That is, because barometric pressure inside dome 12 increases when blower 16 is in operation, this causes the liquid level under the dome 12 to be slightly lower than the static level of the pond.

Floatation device 14 is preferably a pontoon; however, flotation device 14 can be made of any material and define any shape capable of keeping aerator device 10 afloat. Floatation device 14 is preferably attached to a submerged or floating frame 46 (not shown) for support and positioning of dome 12, lower housing 18, and other components of aerator device 10. Flotation device 14 preferably includes ballast 102 to allow for user-controlled or controller controlled height adjustment of aerator device 10 in relation to liquid line 24. Such ballast 102 allows the operator or controller to adjust the position of aerator device 10 relative to the static pond level, the specific gravity of the liquid, or the barometric pressure under dome 12. Flotation device 14 preferably includes maintenance deck 26 on top side 17 of flotation device 14, wherein maintenance deck 26 preferably extends outwardly along the circumference of dome 12. It is recognized that flotation device 14 may be detachable from frame 46 to reduce the width of aerator device 10 for ease of transporting and flotation device 14 may be adjustable in relation to frame 46 (up and down) and utilized to position aerator device 10 up and down relative to liquid line 24 and flotation device 14.

Lower housing 18 preferably defines a partially submerged conduit having closed sides and bottom (not shown), thereby forming a submerged channel with an open top (not shown) and opposing open sides 21 and 23. Lower housing 18 is preferably attached to frame system 46 (not shown). Lower housing 18 is preferably made of a watertight and corrosion resistant material, however, lower housing 18 can be constructed of any material capable of directing the inflow and outflow of liquid through a designated passageway. Open end 21, referenced as the intake 21, preferably has intake screen 20 to prevent debris, marine life, and large particulates from entering aerator device 10. In addition, open end 23 referenced as the discharge 23, preferably has discharge screen 22 to prevent debris, marine life, and large particulates from entering aerator device 10. Such screening enables positioning of intake 21 and discharge 23 of lower housing preferably submerged below the liquid line thereby creating a sealed environment and minimizing the noise, foam and odor escaping from aerator device 10.

Figure 2:
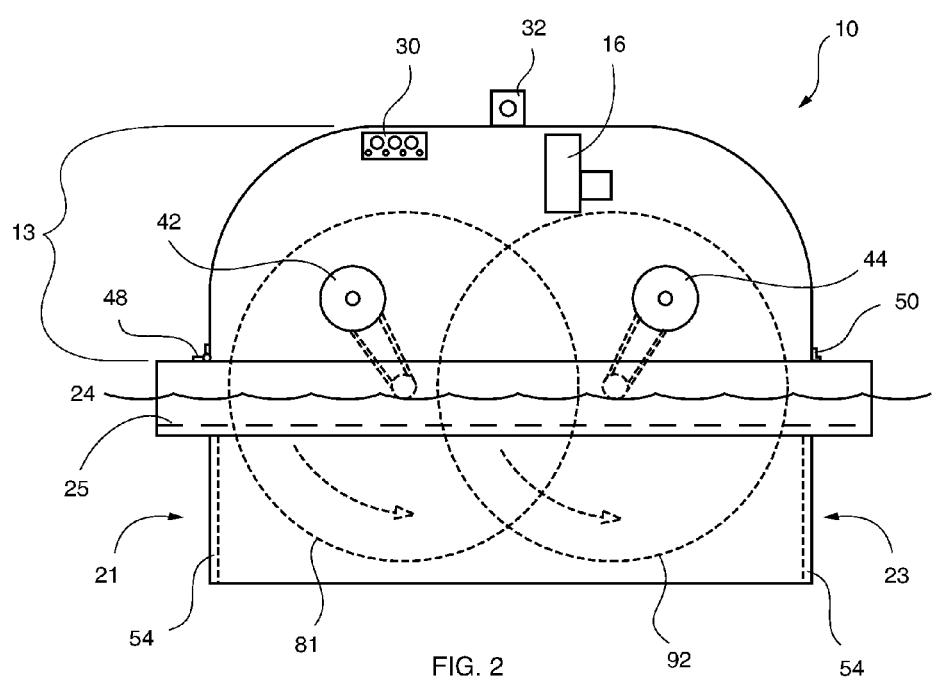
FIG. 2 is a front sectional view of the aeration apparatus of FIG. 1.

Dome 12 is preferably affixed to lower housing 18, preferably via a corrosion resistant hinge 48 and latch 50 assembly (shown in FIG. 2). Although hinge 48 and latch 50 are preferred, any appropriate affixing device of any standard mechanism can be utilized, including but not limited to nut and bolt, latch, lock, catch and/or clasp as long as the configuration is capable of holding dome 12 in contact with lower housing 18.

Drive 28 is preferably a variable speed AC or DC drive, including but not limited to any gear reduction, belt, chain, or shaft driven. Drive 28 can be any standard design with horse power, variable rotational speed, and directional ratings capable of rotating the mechanical agitation of aerator device 10. Drive 28 is preferably fixed to frame 46 of flotation device 14. Struts or brace members (not shown) preferably provide a generally rigid support for frame 46 and functions as a mounting plate for drive 28. Power sources capable of operating drive 28 and/or aerator device 10 include but are not limited to alternating current, direct current, compressed air, hydraulic and or solar power.

Controller 30 is preferably a multichannel digital motor control and sensor data receiver enabling recording of historical data and programmable control for automated operation of aerator device 10. Controller 30 can be any standard drive controller that matches drive 28. Controller 30 may include other features such as a blower controller that monitors the pressure under dome 12 and regulates blower 16 to maintain a specified pressure under dome 12. Controller 30 may also include a scheduler to preset hourly, night and day, daily, weekly, monthly seasonal and/or other runtime schedules for aerator device 10. Controller 30 may also include inputs from environmental sensors 31, including but not limited to wastewater temperature, dissolved oxygen content of the wastewater or other liquid, pressure inside and outside dome 12, dept of aerator device 10, water level inside compartmental enclosure 15, and/or air temperature inside dome 12 wherein each sensor reading is preferably collected and available from inside, outside, and/or remotely from aerator device 10, in addition a light sensor to determine and record whether the measurement is collected during night or day. With these inputs, controller 30 is able to maximize the efficiency of the transfer rate of gas to liquid by modifying the operation of aerator device 10 based on essentially real-time inputs from environmental sensors 31, wherein energy consumption is also minimized. Controller 30 is preferably positioned proximate top portion 13; however, controller 30 can be placed anywhere on aerator device 10 that is accessible by an operator from maintenance deck 26 on top side 17 of flotation device 14. Controller 30 can be remotely controlled by a wireless radio frequency, infrared signal, or any other suitable transmission and receive source, thereby enabling aerator device 10 to be programmed or operated from a remote location.

As illustrated in FIG. 1, aerator device 10 preferably has lifting eye 32 suitably fixed to frame 46 of flotation device 14. Lifting eye 32, together with frame 46 of flotation device 14, preferably enables aerator device 10 to be lifted in and out of a wastewater pond via a hoist or crane. Lifting eye 32 can be in the form of a single or multiple lifting eye(s) and can be located anywhere on aerator device 10 suitable for attachment to frame 46 of flotation device 14.

Referring now to FIG. 2, there is illustrated a front cross-sectional view of floating dome aerator device 10 with preferred placement of the internal mechanics of aerator device 10 shown. Two drives 42 and 44 are preferred and shown for aerator device 10, a leading drive 42 and a trailing drive 44. Leading drive 42 and trailing drive 44 preferably rotationaly operate in the same direction and at the same speed; however, drives 42 and 44 are preferably capable of operating at different speeds. For example, trailing drive 44 could operate at 2× the speed of leading drive 42.

Both leading drive 42 and trailing drive 44 are preferably attached to frame 46. Frame system 46 is preferably made of a light weight and corrosion resistant material, including but not limited to tubing, cables, and/or angled iron or aluminum, or combinations of the same or any other suitable material. Frame 46 can be constructed of any material capable of supporting and positioning leading drive 42, trailing drive 44, dome 12, lower housing 18, flotation device 14, and the other system components of aerator device 10. Lifting eye 32 is securely affixed to frame system 46.

Vane 54 is a variable flow control device that can be mounted on intake 21 or discharge 23 of lower housing 18. Vane 54 is preferably made of a corrosion resistant material. A plurality of vanes 54 preferably enable control of the flow of liquid into and out of lower housing 18, thereby maximizing the transfer of gas to the liquid. The positioning of plurality of vane 54 can preferably be set by an operator or controlled by controller 30.

Referring now to FIG. 2.1, there is illustrated a front view of floating aerator device 10. Preferably, aerator device 10 comprises one or more or an array or plurality of openings, vents or evacuation ports, such as orifices 27.4 configured in dome 12, and whether dampened or vented, such as by valve mechanism 27.3 configured to adjust the flow through orifices 27.4. Orifices 27.4 are preferably positioned at locations around the perimeter of dome 12 and are further configured to enable air to exit or purge from dome 12 while blower 16 maintains a specified pressure (hyperbaric pressure condition) under dome 12. Valve mechanism 27.3 may be adjustable by turning or other mechanical movement, such as rotation R configured to adjust the flow through orifices 27.4. Moreover, one or more orifices 27.4 may be positioned proximate liquid line 24 and/or interior liquid line 25 in dome 12. Furthermore, orifices 27.4 may be provided with an extension conduit, duct, or spout, such as vent tube 27 configured to enable air to exit dome 12 above liquid line 24. In a preferred embodiment, one or more orifices 27.4 configured with vent tube 27 may have orifices 27.4 positioned above interior liquid line 25 in dome 12. Moreover, one or more orifices 27.4 may be configured proximate the front or in flow I of liquid into dome 12. Referring now to FIG. 2.1A, there is illustrated a side view of vent tube 27. Preferably, vent tube 27 includes a vent hole or evacuation port, such as orifice 27.4 formed in dome 12 and preferably orifice 27.4 is positioned above interior liquid line 25, a conduit or duct, such as spout 27.6 is preferably positioned adjacent dome 12 and preferably extending above liquid line 24 to opening 27.5. Vent tube 27 and orifices 27.4 are preferably configured to enable air A or other gases to exit dome 12 while blower 16 maintains a specified pressure under dome 12. Furthermore, vent tube 27 is preferably configured to vent air A or other gases released below liquid line 24, such as from the surface of interior liquid line 25 in dome 12, which is preferably below liquid line 24.

It is contemplated that dome 12 may include other orifices 27.4 positioned above liquid line 24 to vent or purge air from interior space 15 under dome 12.

It is contemplated herein that the size and number of orifice 27.4 and/or vent tube 27 may vary depending on the application of dome aerator device 10, the specified pressure of blower 16 maintained under dome 12, and/or the liquid or liquid medium aerator device 10 is operating in or flowing in I and out O of dome aerator device 10.

It is contemplated herein that orifice 27.4 and/or vent tube 27 may be restricted by adjustable valves 27.3 or sized statically with an orifice sized as to allow for atmosphere venting of dome 12 to be made only in sufficient amounts to maintain the pressure and presence of fresh atmosphere at all times and at all sections under dome 12 of aerator device 10.

It is recognized herein that blower 16 maintains a specified pressure under dome 12 resulting in interior liquid line 25 preferably positioned below liquid line 24. Moreover, blower 16 maintains a specified pressure under dome 12 resulting in interior liquid line 25 being preferably positioned below orifice 27.4.

It is contemplated herein that blower 16 may require pressure equalization to maintain a specified pressure under dome 12 and thus, may require orifice 27.4 and/or vent tube 27 to be plumbed, piped or connected to an equalization chamber to maintain a specified pressure under dome 12.

It is contemplated herein that blower 16 is configured to provide sufficient inflow of air A to maintain positive pressure under dome 12 of aerator device 10.

It is contemplated herein that orifice 27.4 and/or vent tube 27 may be arranged, plumbed, piped or connected to allow for the capture of waste gas or bad gas BG for reprocessing.

Referring now to FIG. 2.2, there is illustrated a front view and sectional cross-sectional view of dome aerator device 10. Preferably, dome aerator device 10 comprises blower 16 to maintain a specified pressure under dome 12 resulting in interior liquid line 25 preferably positioned below orifice 27.4. FIG. 2.2A illustrates, blower 16 is preferably configured to maintain a specified pressure under dome 12 with orifice 27.4 and/or vent tube configured to vent or purge air A or other gases from interior space 15 under dome 12 and shown exiting orifice 27.4 and/or vent tube 27 as air A or other gases BG. Preferably, dome aerator device 10 comprises blower 16 to maintain a specified pressure under dome 12 resulting in interior liquid line 25 preferably positioned below orifice 27.4.

It is contemplated herein that blower 16 is configured to provide sufficient inflow of air A to maintain positive pressure under dome 12 of aerator device 10. As the pressure under dome 12 of aerator device 10 rises, it pushes, creates pocket(s), down in interior liquid line 25, creating a localized high pressure zone in interior liquid line 25 that matches the high pressure zone in the atmosphere under dome 12 of aerator device 10. In this environment, plurality of strakes 70 (shown in FIGS. 3 and 4) on rotating leading disc 81 preferably strike or impact interior liquid line 25 and liquid or liquid medium LM to cause a release of saturated gasses trapped in the liquid, such as bad gas BG to release from the liquid at interior liquid line 25. Preferably, leading disc 81 causes the release of a portion or substantial portion of the trapped gases from the liquid medium LM.

Referring now to FIG. 2.2B, there is illustrated a cross-sectional view of an area between liquid line 24 and interior liquid line 25 of floating dome aerator device 10. Preferably, the first disc or leading disc 81 is partially submerged below interior liquid line 25 and partially exposed in air A under dome 12. Preferably, a plurality of strakes 70 (shown in FIGS. 3 and 4) on rotating leading disc 81 preferably strike or impact interior liquid line 25 of liquid medium in scrubbing area 101 as liquid medium LM enters dome 12 to cause the release, extraction, or scrubbing (decreasing the dissolved gas in the liquid medium) of dissolved, held, or suspended—unwanted or waste gases, such as bad gases BG in liquid medium, for example carbon dioxide $CO_2$, hydrogen H, hydrogen sulfide, methane $CH_4$ and the like (extracted gas from liquid medium) into dome 12. Upon the release of bad gases BG blower 16 and its flow of air A sweeps or carries bad gases BG across interior liquid line 25 to orifice 27.4 and/or vent tube 27 configured to vent, extract, or purge air A and bad gases BG from interior space 15 under dome 12 while maintaining a specified pressure under dome 12.

Figure 5:
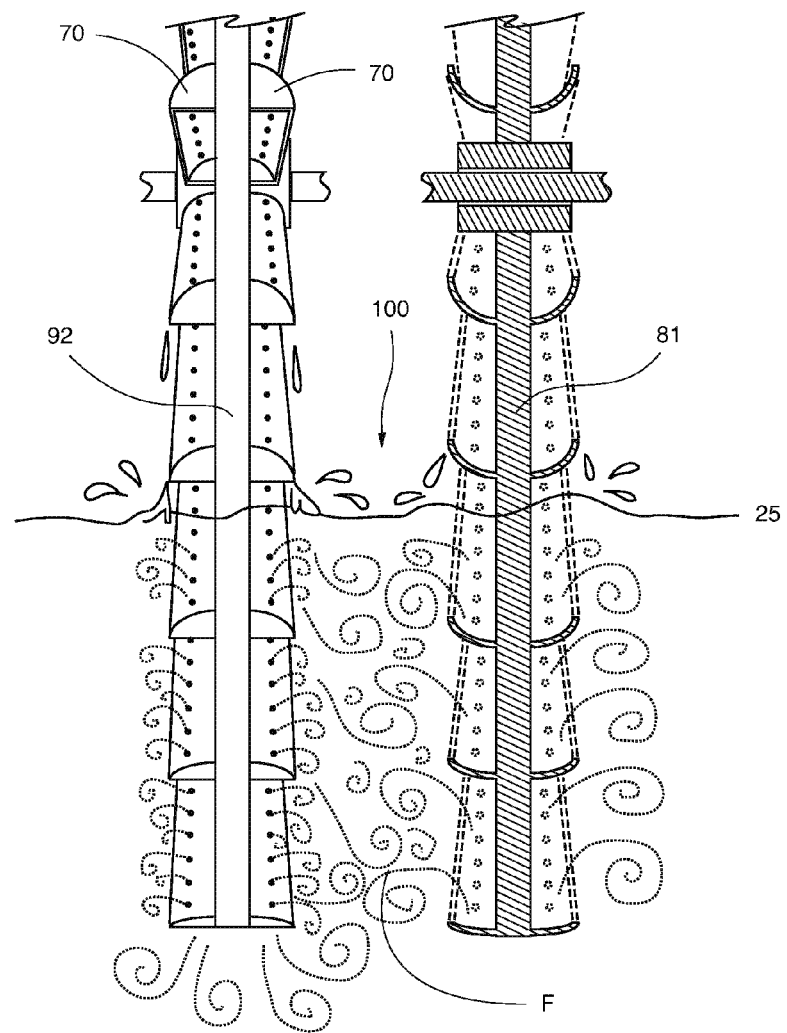
FIG. 5 is an enlarged partial sectional view depicting the dynamics of the liquid gas mixing area, showing radial strakes and bleed holes according to an example embodiment.

Moreover, liquid medium LM, overladened with bad gas BG, has been scrubbed or purged of a portion or substantial portion of bad gas BG and is in a prepared condition to accept, introduce, or intake oxygen or air A in mixing area 100 (shown in FIG. 5). Such step, shown herein FIG. 2.2, increases the efficiency of the liquid medium to accept, introduce, or intake of oxygen or air A in mixing area 100 by making space available in liquid medium LM for intake of oxygen or air A. Still further when blower 16 pressurizes dome 12 and blower 16 evacuates such bad gas BG and air A through orifice 27.4 out of dome 12, liquid medium LM and interior liquid line 25 are preferably exposed to air A without any pockets of bad gas BG.

It is further recognized that bad gases BG are brought into dome 12 aerator device 10 trapped in the incoming liquid or liquid medium LM.

It is contemplated herein that blower 16 is preferably capable of providing sufficient air flow and pressure to maintain positive pressure under dome 12 for the purposes set forth herein, to maintain interior liquid line 25, and to sweep or carry bad gases BG across interior liquid line 25 to orifice 27.4 and/or vent tube 27. In all cases, the desired elevated pressure under dome 12, the hyperbaric chamber, is maintained by regulating the size of orifice 27.4, vent tube 27, and/or, adjusting the volume of incoming fresh atmosphere or air A provided by blower 16.

It is recognized herein that the release or scrubbing of the released dissolved or suspended bad gases BG in scrubbing area 101 enables and/or makes room for liquid medium to intake additional gas, such as oxygen $O_2$ (dissolved oxygen) in mixing area 100 (shown in FIG. 5); thus, increasing the efficiency of dissolving wanted gas, such as oxygen into liquid medium LM, ie., into the vacated space of released, degased, or scrubbed bad gases BG, which were released from liquid medium LM in scrubbing area 101.

It is recognized herein that the release or scrubbing of dissolved or suspended bad gases BG in scrubbing area 101 enables and/or makes room for warm (greater than 70 degrees Fahrenheit) liquid medium LM to intake additional oxygen $O_2$ (dissolved oxygen) in mixing area 100 (shown in FIG. 5); thus, increasing the efficiency of dissolving oxygen into warm liquid medium, ie., into the vacated space from released or scrubbed bad gases BG, which were released from warm liquid medium LM in scrubbing area 101. It is further recognized herein that scrubbing area 101 enables and/or makes room for warm liquid medium to intake oxygen (dissolved oxygen) in mixing area 100 (shown in FIG. 5); and thus, without the released or scrubbed bad gases BG being released in scrubbing area 101, mixing area 100 is less efficient or possibly unable to add oxygen $O_2$ (dissolved oxygen) in mixing area 100 to liquid medium LM.

It is contemplated herein that bad gases BG in liquid medium, such as carbon dioxide $CO_2$, hydrogen H, hydrogen sulfide, methane $CH_4$ or the like may be recycled, captured, and/or reclaimed from orifice 27.4 and/or vent tube 27 configured to vent or purge bad gases BG from interior space 15 under dome 12 by a pipe systems, header or manifold connected to vent tube 27 to capture of waste gas or bad gas BG for reprocessing.

Referring now to FIG. 2.3, there is illustrated a front view of aerator device 10. Preferably, aerator device 10 includes angle adjustable intake debris shield, such as angle adjustable intake screen 130 and depth adjustable vector discharge device, such as depth adjustable discharge chute 140. Adjustable intake screen 130 preferably includes support arm 138 having pivot device 139 disposed on one end of support arm 138 and operator handle 134 disposed on the other end of support arm 138. Moreover, support arm 138 further preferably supports debris screen 54A and enables anglar positioning along arc A of debris screen 54A relative to intake 21. Debris screen 54A is preferably configured to block debri, marine life, or other suspended particulate in liquid medium LM from entering intake 21 of aerator device 10. Adjustable intake screen 130 preferably includes end caps, such as end guards 133 having a top end 135 positioned above liquid line 24 and together configured to prevent debris from making an end around debris screen 54A. In use an operator of aerator device 10 may increase the angled positioning along arc A of debris screen 54A relative to intake 21 to increase the surface area of debris screen 54A relative to in I of liquid medium LM entering aerator device 10. Debris screen 54A is preferably made of a corrosion resistant material and preferably enables control of the flow of liquid into and out of lower housing 18, thereby maximizing the transfer of gas to the liquid medium. The positioning of plurality of debris screen 54A can preferably be set by an operator or controlled by controller 30.

Depth adjustable discharge chute 140 preferably includes tube or passageway, such as conduit 147. Preferably conduit 147 is configured as contoured or s-shaped but other shapes and figures are contemplated herein. Conduit 147 preferably includes upper panel 145, lower panel 146, intake 147, and outlet 144 configured to discharge in flow I of liquid medium LM entering aerator device 10 from aerator device 10 as out flow O. It is contemplated herein that in flow I of liquid medium LM entering aerator device 10 may occur at depth DI relative to liquid line 24. It is further contemplated herein that out flow O of liquid medium LM exiting aerator device 10 may occur at depth DD relative to liquid line 25.

It is contemplated herein that a similar intake chute or vectored intake chute could be mounted on aerator device 10 to enable in flow I of liquid medium LM entering aerator device 10 to be taken at variable depths DI relative to liquid line 24.

Referring now to FIG. 2.4, there is illustrated a front view of aerator device 10, in use. Preferably, in flow I of liquid medium LM entering aerator device 10 preferably occurs at depth (in) DI relative to liquid line 24 and out flow O of liquid medium LM exiting aerator device 10 preferably occurs at depth (discharge) DD relative to liquid line 24, thus, aerator device 10 enables in flow I of liquid medium LM at one depth, level or strata of the liquid medium LM and discharges out O/fluid eddy F1 of liquid medium LM at another depth, level or strata of the liquid medium LM, resulting in aerator device 10 ability to mix layers or strata of the liquid medium LM from interior liquid line 25 to the bottom or full depth of liquid medium LM. Preferably, fluid eddy F1 represent mixing of the different vertical columns or strata of liquid medium LM. Moreover, fluid eddy F1 represent mixing of the different horizontal layers or strata or depths of liquid medium LM. It is further recognized herein that the ability to enable inlet water to be acquired at one strata (level) and discharge outlet water to be released or discharged at another strata (level) is beneficial to a bacterial colony as well as the phytoplankton and zoo-plankton when liquid medium LM temperatures vary from one strata to another of liquid medium, basins, or lagoons, such as pond P. It is further recognized herein that outlet 144 of conduit 147 may be configured with a flow direction device, such as adjustable vanes to enable variable direction of out flow O of liquid medium LM discharged from conduit 147 in a vertical and/or horizontal direction.

It is still further contemplated herein that aerator device 10 with adjustable vanes positioned at outlet 144 of conduit 147 may be utilized in different size, shape and depth of basins or ponds by directing the outflow angle of conduit 147 to reach different depths of basins or pond P (shown in FIG. 2.5).

Referring now to FIG. 2.5, there is illustrated a top view of aerator devices 10 operating in liquid medium LM. Preferably, out flow O of liquid medium LM exiting or discharged from aerator device 10 in combination with in flow I of liquid medium LM entering aerator device 10 generates a soft wave throughout liquid medium LM to place liquid medium LM in motion represented by a plurality of flow vectors, two shown, such as starboard flow vector SB and port flow vector PT. It is contemplated herein that the plurality of flow vectors, such as starboard flow vector SB and port flow vectors PT resembles the shape of a magnetic field or torus with aerator device 10 positioned in the proximate center and a plurality of flow vectors originating at open side or discharge 23 and returning to opposing open side or intake 21. It is further contemplated herein that the plurality of flow vectors generated by aerator device 10, such as starboard flow vectors SB and port flow vectors PT, effectively generate or produce two large counter rotating bodies of liquid medium LM, such as first rotating liquid medium LM1 and second rotating liquid medium LM2. It is recognized herein that starboard flow vectors SB are configured to rotate counter-clockwise. It is recognized herein that port flow vectors PT are configured to rotate clockwise. It is contemplated herein that first rotating liquid medium LM1 and second rotating liquid medium LM2 represent the mixing of the different vertical layers, columns or strata of liquid medium LM. It is contemplated herein that first rotating liquid medium LM1 and second rotating liquid medium LM2 represent the mixing of the different horizontal layers or strata or depths of liquid medium LM.

It is still further contemplated herein that the combination A) in flow I of liquid medium LM at one depth or strata of the liquid medium LM and discharges out flow O/fluid eddy F1 of liquid medium LM at another depth or strata of the liquid medium LM via conduit 147, resulting in aerator device 10 ability to mix layers or strata of the liquid medium LM of FIG. 2.4 and B) first rotating liquid medium LM1 and second rotating liquid medium LM2 of FIG. 2.5, resulting in aerator device 10 ability to mix columns or strata of the liquid medium LM, together aerator device of FIG. 2.4 and FIG. 2.5, represent aerator device 10 ability to mix or move rows and columns or layers or 3D strata of the liquid medium LM to fully mix liquid medium LM.

It is still further contemplated herein that aerator device 10 is preferably matched to the size and requirements of liquid medium LM. Preferably, but not limited hereto, aerator device 10 indicate a ratio of approximately fifteen horsepower per acre of surface area with an effective depth of up to seven feet of liquid medium LM. It is recognized herein that aerator device 10 may be configured and/or sized to accommodate a variety of depths and surface areas of liquid medium LM. Such horsepower per acre requirement is substantially less of an energy or power requirement than other competing technologies to aerate and/or mix liquid medium LM, such as ponds, basins, or lagoons. Moreover, aerator device 10 is preferably capable of placing an entire liquid medium LM, such as ponds, basins, or lagoons into motion.

It is still further contemplated herein that aerator device 10 is preferably configured to convert a single body of liquid medium LM into a rudimentary but highly effective wastewater treatment facility.

It is still further contemplated herein that aerator device 10 is preferably configured to generate two large counter rotating bodies of liquid medium, such as first rotating liquid medium LM1 and second rotating liquid medium LM2 in a single body of liquid medium LM.

It is still further contemplated herein that aerator device 10 is preferably configured to generate torus shaped wave in pond P, defined as first rotating liquid medium LM1 or starboard flow vector SB and second rotating liquid medium LM2 or port flow vector PT.

Referring again to FIG. 2.5, there is illustrated a top view of aerator devices 10 operating in liquid medium LM, basins, or lagoons, such as pond P. In use as a rudimentary wastewater treatment facility, wastewater, such as raw sewerage RS is introduced into pond P on one side of the ponds two rotating waves, such as first rotating liquid medium LM1 and second rotating liquid medium LM2. The raw sewerage RS and its particulate, are held in suspension by the slowly rotating liquid mass of first rotating liquid medium LM1 and second rotating liquid medium LM2. Preferably, first rotating liquid medium LM1 is isolated to one side of pond P as it is actually turning independently of second rotating liquid medium LM2 on the other side of pond P, effectively splitting pond P into at least two halves. It is further recognized herein that a single machine, such as aerator devices 10 creates the two counter rotating bodies of liquid medium, first rotating liquid medium LM1 and second rotating liquid medium LM2. Preferably, first rotating liquid medium LM1 and second rotating liquid medium LM2 discharge and meet in the middle of pond P as they travel through aerator devices 10 positioned in the proximate center of pond P. Preferably, transitioned raw sewage RS(x) traverses with first rotating liquid medium LM1 and eventually transitioned raw sewage RS(x) passes through aerator devices 10 and to the other side of aerator devices 10 via second rotating liquid medium LM2 where it traverses with second rotating liquid medium LM2. Once transitioned raw sewage RS(x) is on the other side of aerator devices 10, transitioned raw sewage RS(x) is pushed or discharged via second rotating liquid medium LM2 out discharge D, preferably on an opposite side of pond P. Preferably, raw sewerage RS goes through the rotating and settling process and microbial/bacterial digestion of raw sewage RS in oxygenated liquid medium LM transitioning thereto transitioned raw sewage RS(x), a treated effluent liquid. It is recognized herein that transitioned raw sewage RS(x), progresses through this rotating and settling process many times during the course of it's passage through first rotating liquid medium LM1, aerator device 10, and second rotating liquid medium LM2 of pond P. It is further recognized herein that the overall effect of first rotating liquid medium LM1, aerator device 10, and second rotating liquid medium LM2 is to hold transitioned raw sewage RS(x) in pond P for a long period of time and/or maximum amount of time possible to allow the solids suspended in raw sewage RS to settle out of liquid medium LM and to enable the bacterial colony as well as the phytoplankton and zoo-plankton active in the oxygenated liquid medium LM to metabolize raw sewage RS suspended in oxygenated liquid medium, thus, transforming raw sewage RS to transitioned raw sewage RS(x). Moreover, these life forms, such as bacterial colony as well as algae, phytoplankton and zoo-plankton, and the like, are very prolific and diverse, and supported by the rich oxygen environment as well abundant organic matter to feed on in a slow, gently moving habitat. This action, the mixing, oxygenation, settling, and metabolizing of wastewater, such as raw sewage RS, and the gradual movement or transfer of the best liquid medium LM from one stage to the next, such as from first rotating liquid medium LM1 to second rotating liquid medium LM2 and back from second rotating liquid medium LM2 to first rotating liquid medium LM1 where the process is repeated is a preferred wastewater treatment process, desired in every type of activated sludge wastewater treatment facility.

Figure 4A:
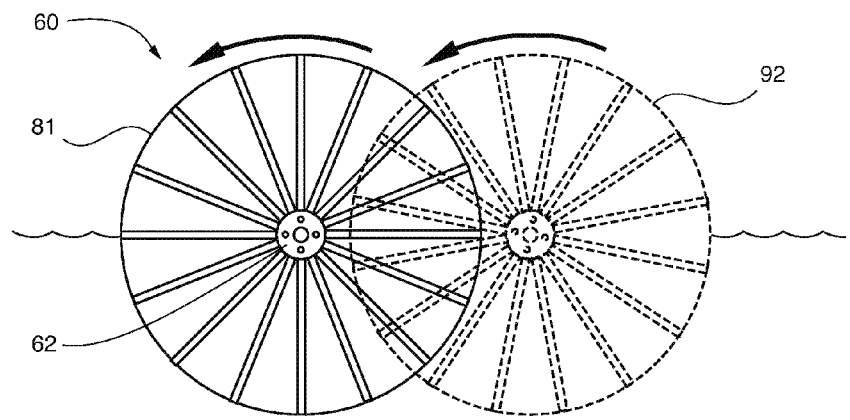
FIG. 4A is front sectional view of a pair of discs showing their direction of rotation according to an example embodiment.

Referring now to FIG. 4A, a front view of a preferred disc 60 of aeration apparatus is shown. Disc 60 is preferably a thin flat disc made of corrosion resistant material. Disc 60 can be constructed of any material, configuration and/or dimension capable of being rotated through the sludge of liquid, such as fresh, salt and brackish water, wastewater, sewage and industrial waste. Possible shapes and configurations include, without limitation, a star, square, hexagon, octagon, and any other configurations capable of defining a mixing area and a shear force zone within a liquid medium. Disc 60 preferably has keyed hub 62 at its center for affixing disc 60 to shaft 45 (shown in FIG. 4B). Although keyed hub 62 is preferred, any suitable affixing device could be utilized of any standard design configured to attach disc 60 to a shaft 45. The preferred keyed hub 62 allows for disc spacing and adjustment on shaft 45, thereby maintaining proper spacing.

Figure 3:
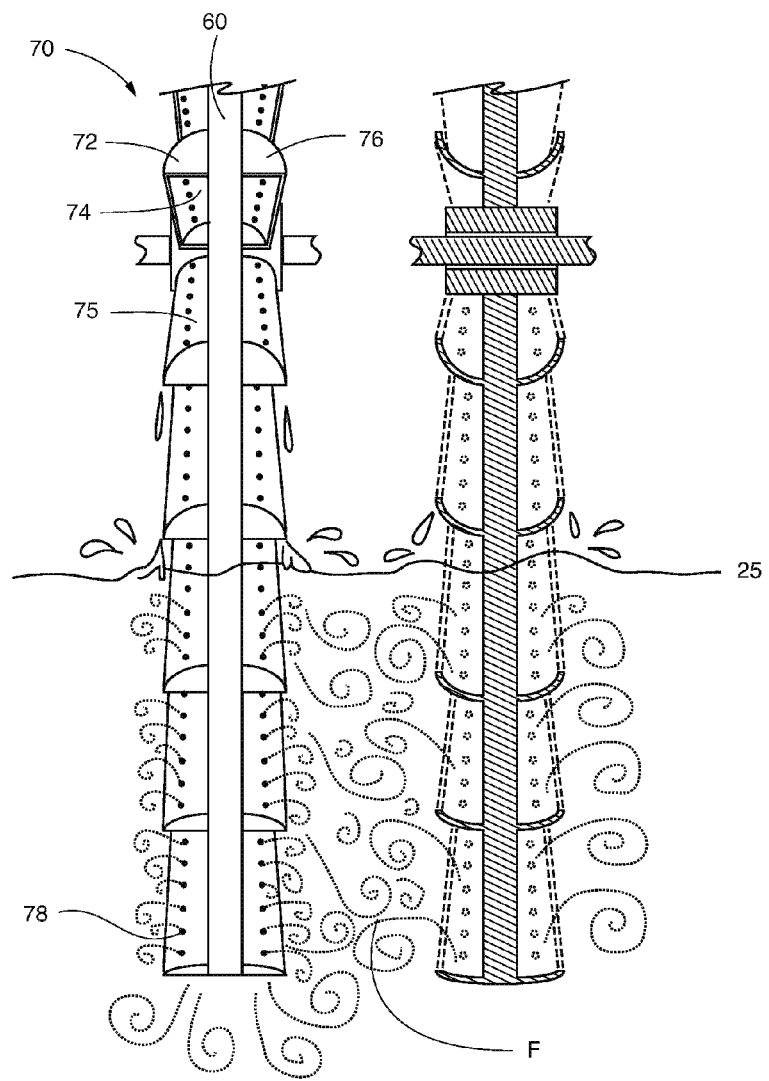
FIG. 3 is perspective view of a strake with bleed holes according to an example embodiment.

Referring now to FIG. 3, 3.1, a perspective view of preferred strake 70 of the aeration apparatus is shown. Strake 70 is preferably made of a watertight and corrosion resistant material; however, strake 70 can be constructed of any material capable of carrying liquid and/or gas. Strake 70 preferably has quarter circle, u-shaped or generally triangular shaped end cap 72, open leading face 74, trailing face 75 and mounting face 76, wherein faces 74, 75, 76 preferably extend lengthwise along strake 70 forming peripheral edges of a channel for strake 70 to carry liquid and/or gas. Additionally, strake 70 preferably has a plurality of bleed holes 78 defined through trailing face 75.

Strake 70 can be varied in size, shape, angle, and bleed hole placement to maximize aerator device 10 dissolved gas transfer rate in any liquid medium. For example, a smaller strake moving at a higher speed may be more effective on wastewater with high solids content, whereas a large strake at lower speeds may be more effective on wastewater with smaller solids and also may be less disturbing to marine life. Furthermore, strake 70 can be varied in size, shape, angle, and bleed hole placement to account for the centrifugal force on the liquid. A plurality of strakes 70 are preferably secured to both sides of disc 60 in a radial configuration with each open face 74 oriented in same direction. Each strake 70 is arranged in a radial configuration beginning at the center of disc 60 and extending outward to the outer circumference edge or peripheral edge of disc 60, wherein flat face 76 of strake 70 is preferably affixed to disc 60, preferably via corrosion resistant bolt and nut (not shown). Although corrosion resistant bolt and nut are preferred, the affixing device can of any standard mechanism, and may be selected dependent on the material used for disc 60 and strake 70, including but not limited to welding, adhesive, or epoxy. The illustration shown in FIG. 3 is not a specification or limitation on the number of strakes 70 affixed to disc 60.

Referring now to FIG. 3.1, a perspective view of preferred strakes 70 of the aeration apparatus is shown. Preferably, a plurality of strakes 70 on rotating leading disc 81 preferably strike or impact interior liquid line 25 of liquid medium LM in scrubbing area 101 to cause the release of bad gases BG (extracted gas) from liquid medium LM. Upon the release or extraction of bad gases BG from liquid medium LM air A sweeps or carries bad gases BG across interior liquid line 25 to orifice 27.4 and/or vent tube 27 configured to vent air A and bad gases BG from interior space 15 under dome 12; thus, scrubbing bad gases BG from liquid medium.

It is contemplated herein that scrubbing area 101 extracts or removes bad gas BG from liquid or liquid medium LM and dome aerator device 10 presents gas depleted liquid or liquid medium LM to mixing area 100 (shown in FIG. 4) for injection of good or desired gas, such as oxygen, ozone, or the like.

Referring now to FIG. 4A, a front sectional view of a pair of preferred discs 60 of the aeration apparatus is shown, depicting the preferred arrangement, area of overlap, and direction of rotation. Leading disc 81 and trailing disc 92 are preferably arranged so they overlap to form aeration apparatus under pressurized dome 12, as discussed below. Both disc assemblies are preferably partially submerged in a liquid medium, preferably at a depth of at least 40% of their diameter; however, both disc assemblies can be submerged in a liquid medium LM to any depth, wherein at least part of the disc assemblies are exposed to the atmosphere under dome 12. Mixing area 100 is created below liquid line 24 and interior liquid line 25 between where the leading disc 81 and trailing disc 92 overlap as also depicted in FIG. 5. The plurality of strakes 70 on leading disc 81 capture liquid from the wastewater pond and carry it up into mixing area 100. Plurality of strakes 70 on trailing disc 92 preferably capture air underneath dome 12 and carry it down into mixing area 100.

As depicted in FIG. 4A, when strake 70 is rotated up out of the liquid, it carries liquid up and out of the wastewater pond. This carried liquid escapes through bleed holes 78, thereby creating additional liquid surface area which comes into contact with air, thereby resulting in an additional transfer of gas to the liquid. When strake 70 is rotated down into the liquid, it carries air down into the wastewater pond. The air escapes through a plurality bleed holes 78, thereby creating additional submerged air which comes into contact with liquid, resulting in additional transfer of gas to the liquid.

Figure 4B:
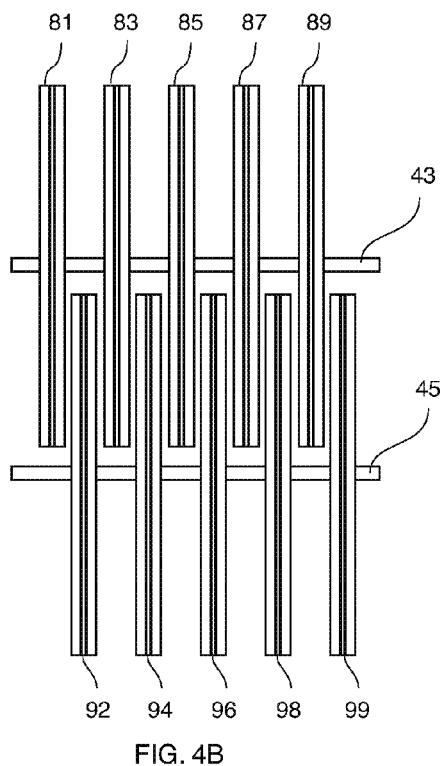
FIG. 4B is a top sectional view of disc array showing two sets of discs interleaved amongst each other according to an example embodiment.

Referring now to FIG. 4B, a top sectional view of two sets of plurality of discs 60 of the aeration apparatus intermeshed amongst each other are shown. Leading drive 42 is connected to leading shaft 43 and one or more disc 60 (shown as leading disc assemblies 81, 83, 85, and 87) are preferably affixed to leading shaft 43. Trailing drive 44 is connected to trailing shaft 45 and one or more disc 60 (shown as trailing disc assemblies 92, 94, 96, 98, and 99) are preferably affixed to trailing shaft 45. The illustration shown in FIG. 4B is not a specification or limitation on the number of discs 60 in either array of discs or the number of shafts or the number of drives. These variable parameters are determined by the dissolved gas requirements and other application requirements of the liquid being treated. The leading and trailing disc assemblies are placed in parallel, with their properly spaced discs placed in an overlapping, interlaced relation. Spacing between the discs 60 is preferably accomplished using keyed hub 62; however, spacers (not shown) can be used. Preferably, the overlap between leading and trailing disc assemblies is 45% of the diameter of disc 60; however, the amount of overlap between the two sets of discs may be adjusted by varying the parallel spacing of leading shaft 43 and trailing shaft 45 provided the distance is less than the disc 70 radius.

Referring now to FIG. 5, an enlarged partial sectional view of the aeration apparatus of aerator device 10 is shown, to facilitate explanation of the dynamics of mixing area 100. Strakes 70 on leading disc 81 captures liquid from the wastewater pond and carries it up into the mixing area 100. Strakes 70 on trailing disc 92 captures air from underneath dome 12 and carries it down into mixing area 100, in addition to pushing liquid down into mixing area 100. Discs 81 and 92 and their two strakes 70 moving in unison together create shear force F between the upward and downward moving liquid within the mixing area, resulting in shear (shearing) force F that drives air into the oxygen depleted wastewater. Shearing force F occurs in oxygen rich mixing area 100 resulting in an increased transfer of oxygen into the liquid, such as fresh, salt and brackish water, wastewater, sewage and industrial waste.

Referring now to FIG. 5, an enlarged partial sectional view of the aeration apparatus of aerator device is shown, to facilitate further explanation of additional dynamics of liquid gas mixing area 100. Strakes on the leading disc 81 captures liquid from the wastewater pond and carries it up into mixing area 100. Plurality of bleed holes 78 in trailing face 75 of strake 70 on leading disc 81 will leak liquid into mixing area 100 as fluid eddy F. Strake 70 on the trailing disc 92 captures air from underneath dome 12 and carries it down into mixing area 100. Plurality of bleed holes 78 in trailing face 75 of the strakes on trailing disc 90 leak flurries of air bubbles into mixing area 100. The flurry of air bubbles and fluid eddy F combine in mixing area 100, thereby creating an increased transfer of oxygen into the liquid, such as fresh, salt and brackish water, wastewater, sewage and industrial waste.

It is contemplated in an example embodiment that strakes 70 of aerator device 10 could be configured to provide a cutting or chopping action for operation in high solid and/or high fiber, such as hair, bio solids, plant, and the like, prevailing in primary wastewater sludge ponds. More specifically, strakes 70 could be configured having an I-beam end view with discs 81 or 92 running perpendicular through the center ('—I—') of the I-beam. The edges of the I-beam configuration may comprise sections having raised or sharpened edges to cut through the high solid and/or high fiber, such as hair, bio solids, plants, and the like.

The disc assemblies can be set in motion rotating in unison, or, the individual drive speeds can be utilized, thereby allowing for essentially infinite combinations of liquid and air, shearing forces, liquid eddies, and/or flurries of bubbles, thus allowing for optimum transfer of gas, such as oxygen into the liquid, such as fresh, salt and brackish water, wastewater, sewage or industrial waste.

It is contempalted in an example embodiment that aerator device 10 is suitable for utilization and adaptable without flotation device 14 for use in a pipe, such as a discharge pipe. Furthermore, it is contempalted in an example embodiment that aerator device 10 is adaptable without lower housing 18 for use in a pipe, such as a discharge pipe. Aerator device 10 is preferably mechanically affixed and positioned inside the pipe. Preferably, the flow rate of the liquid in the pipe is adjusted to maintain the liquid level where both disc assemblies are preferably partially submerged in a liquid medium, preferably at a depth of at least 40% of their diameter; however, both disc assemblies can be submerged in a liquid medium to any depth, wherein at least part of the disc assemblies are exposed to the atmosphere under dome 12.

Figure 6:
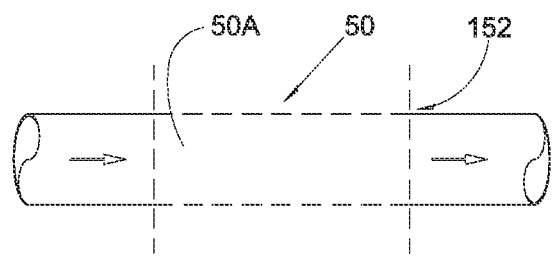
FIG. 6 is a side view of a standard industrial wastewater or discharge pipe.
Figure 7:
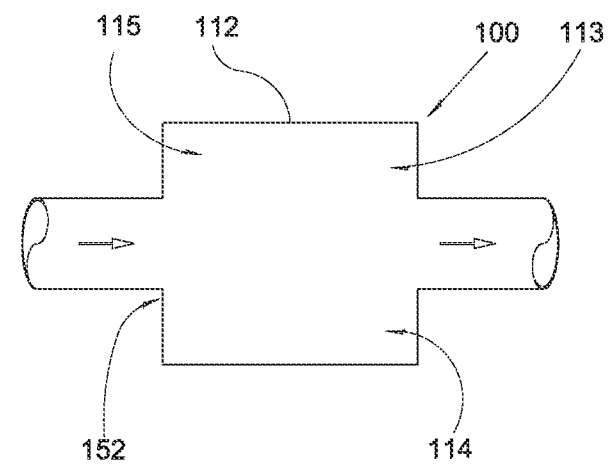
FIG. 7 is a side view of the pipe in FIG. 6 with a section cut out of the pipe and a compartmental enclosure fit between the ends of the pipe.

Referring now to FIG. 6, a standard industrial wastewater or discharge pipe 50 is shown. Referring now to FIG. 7, wherein discharge pipe 50 is shown with section 50A removed from discharge pipe 50 and replaced with sealed enclosure 112. Preferably, enclosure 112 is inserted into the space where section 50A was removed so as to define a space or compartment 115 for containing mechanical agitation of aerator device 100.1. Enclosure 112 preferably is welded W to discharge pipe's 50 adapter ends 152, which remained after cutting or removing section 50A from pipe 50. It is contemplated that enclosure 112 is preferably constructed of an airtight and corrosion resistant material such as fiberglass, metal or the like. That is, enclosure 112 may be constructed of any material capable of holding the area defined by space or compartmental enclosure 115 sealed at a selected, preferably increased barometric pressure. It is recognized that other suitable materials could be utilized without an apparatus and method for mixing gas and liquid. Moreover, enclosure 112 may be affixed to discharge pipe's 50 adapter ends 152 utilizing epoxy, nuts and bolts compressing a seal or sealant or other means known to one of ordinary skill in the art. Enclosure 112 is further divided into upper section 113 of compartment 115, which creates a space above liquid line 124 and lower section 114 of compartment 115, which creates a space below liquid line 124 that contains the liquid medium flowing through discharge pipe 50 and enclosure 112. Similar to FIG. 1, upper section 113 of compartment 115 creates a space above waterline 124 that can collect foam and odor generated by aerator device 100.1. Foam generated by aerator device 100.1 is thus held in close proximity to aerator device 100.1 and must travel back beneath liquid line 124 to escape upper section 113 of compartment 115, further enhancing the transfer of gas to the liquid. Odorous gases generated by the mechanical agitation of aerator device 100.1 are also trapped in upper section 113 of compartment 115 preventing their escape into the surrounding environment resulting in an essentially odor free operation. In addition, upper section 113 of compartment 115 acts as a sound barrier, trapping the noises generated by the mechanical agitation of aerator device 100.1, preventing their escape into the surrounding environment, and thereby resulting in an essentially noiseless operation.

Figure 8:
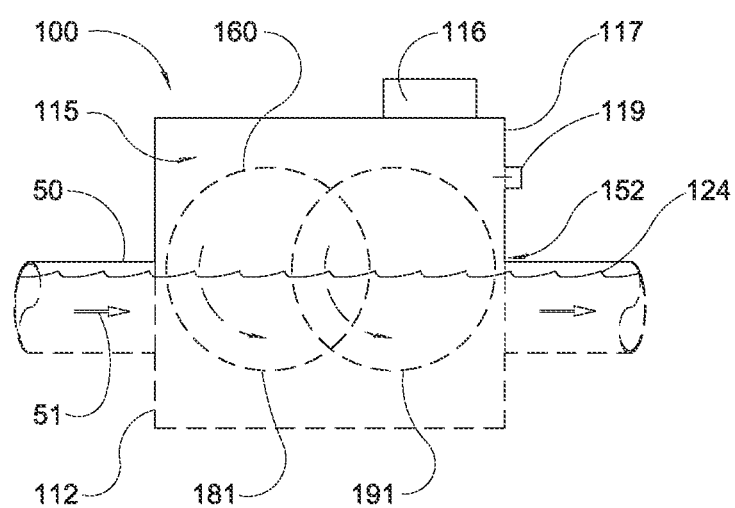
FIG. 8 is a side view of the pipe and enclosure in FIG. 7 with an aeration device housed in the enclosure according to an example embodiment.

Referring now to FIG. 8 is illustrated an example embodiment of a fully enclosed in-line pipe aerator device 100.1. Aerator device 100.1 is a mechanical gas dissolving apparatus operating in a controlled pressurized environment of a discharge pipe 50. In-line pipe aerator device 100.1 operates similar to aerator device 10 of FIGS. 1-5; however, in-line pipe aerator device 100.1 does not include dome 12, flotation device 14, and lower housing 18. As in FIGS. 1-5 in-line pipe aerator device 100.1 includes discs 160 each having strakes 70 as shown in FIGS. 3-5, and 16-17 operating as described in FIGS. 1-5 above functioning to transfer gas to liquid, especially for increasing the concentration of dissolved oxygen in the liquid medium of pipe 50.

Blower 116 is preferably any common industrial variable speed rotary type blower or compressor air source similar to blower 16 of FIG. 1. Blower 116 can be of any standard design with air flow and pressure ratings capable of increasing the barometric pressure of the air in compartment 115 to preferably between approximately 35-40 inches of mercury or 1-3 psi, however, greater barometric pressure can be utilized depending on the gas and liquid medium being mixed. Blower 116 is preferably a single unit with feedback regulator to monitor the pressure in upper section 113 of compartment 115 and is preferably positioned proximate upper section 117 of enclosure 112; however, blower 116 can be in the form of a single or multiple blowers and can be located anywhere on in-line pipe aerator device 100.1 that permits air flow access to interior compartment 115 of enclosure 112. In addition, blower 116 may be remotely positioned relative to compartment 115 of enclosure 112 and pressurized air from blower 116 may be piped or tubed from blower 116 to compartment 115 of enclosure 112. In an example operation, blower 116 increases the barometric pressure in compartment 115 of enclosure 112 creating an ideal environment for the transfer of gas to the liquid in compartment 115 of enclosure 112, wherein coincidentally, surface area is increased via agitation and whirling of liquid by aerator device 100.1. In addition, the increase in barometric pressure in compartment 115 of enclosure 112 assists with popping the foam bubbles, effectively reducing the foam generated by aerator device 100.1.

Blower 116 can preferably be used for facilitating fine adjustment of liquid line 124 in compartment 115 of enclosure 112 by increasing or decreasing the barometric pressure of the air in compartment 115, thus maintaining the liquid line 124 at a predetermined position relative to discs 160. By increasing the air pressure in compartment 115 of enclosure 112, blower 116 causes liquid line 124 to lower forcing the liquid medium out of enclosure 115 and into pipe 50. In contrast, by reducing the air pressure in compartment 115 of enclosure 112 blower 116 causes liquid line 124 to rise allowing the liquid medium to enter enclosure 112 from pipe 50. Moreover, blower 116 with feedback from sensor 119 allows for user-controlled or controller controlled height adjustment of liquid line 124 in compartment 115 of enclosure 112 in relation to discs 160 optimizing dissolve gas in the liquid medium of pipe 50.

Sensor 119 preferably represents one or more sensors, including but not limited to sensors to detect water level, gas pressure, the amount of dissolved gas in the liquid medium, and humidity inside compartment 115 of enclosure 112 and to provide a representative signal of such information for feed back to a controller, user, or directly to blower 116. Various means of sensing and types of sensors to detect liquid level, gas pressure, the amount of dissolved gas in the liquid medium, and humidity are known to one of ordinary skill in the art and are contemplated herein.

Figure 9:
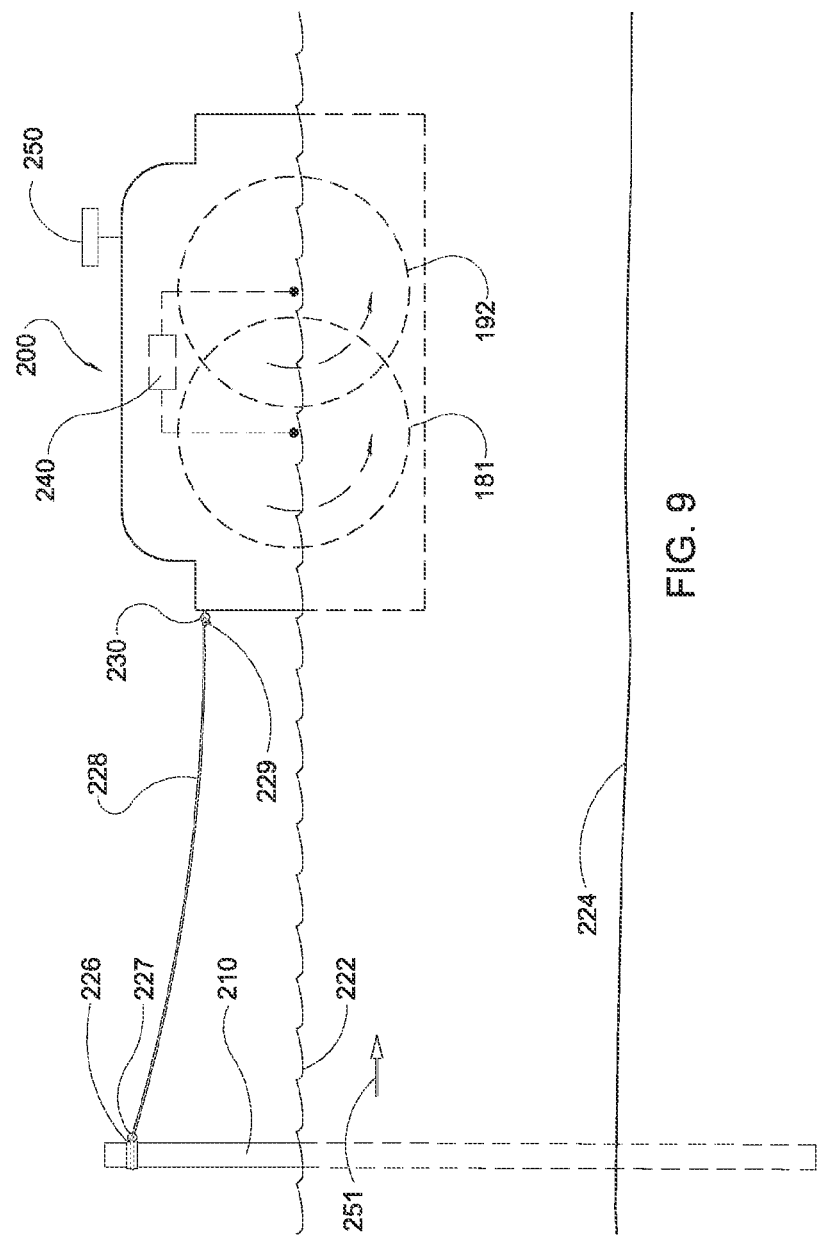
FIG. 9 is a side view of a tethered aeration apparatus of FIG. 1.

Referring now to FIG. 9, illustrates an example embodiment of a tethered aeration apparatus 200 of FIG. 1. Anchor device 210 is permanently affixed to river or tidal bed 224 and extends above liquid line 222 to provide stationary anchor support for tethered aeration apparatus 200. It is contemplated herein that anchor device 210 may be any device capable of securing tethered aeration apparatus 200 in a moving liquid medium such as river flow, tidal movements and the like, including but not limited to buoys. Swivel attachment 226 provides an anchor point for one end 227 of cable 228 to affix to anchor device 210 and the other end 229 of cable 228 is affixed to eye 132 anchoring tethered aeration apparatus 200 relative to anchor device 210, thus pulling tethered aeration apparatus 200 through liquid medium shown travelling in the direction of arrows 251. As river current shift or tidal waters alter direction tethered aeration apparatus 200 preferably shifts positions down stream from anchor device 210 continuing to scoop flowing liquid medium into open end 21, referenced as the intake 21 shown in FIG. 1.

Tethered aeration apparatus 200 operates similar to aerator device 10 of FIGS. 1-5. As in FIGS. 1-5 tethered aeration apparatus 200 includes discs 160 each having strakes 70 as shown in FIGS. 3-5 operating as described in FIGS. 1-5 above functioning to transfer gas to liquid, especially for increasing the concentration of dissolved oxygen in the liquid medium.

It is contemplated herein that tethered aeration apparatus 200 may be moved or tugged (tug boat) to different locations and re-anchored depending on river flow, tidal conditions and/or gas to liquid transfer requirements, especially to achieve dissolve oxygen levels in the liquid medium of interest.

Regenerative or recumbent generator 240 is shown in this embodiment of the tethered aeration apparatus 200, but may be utilized in the in-line pipe aerator device 100.1, floating dome aerator device 10, mechanical agitation of aerator device 100.1, tethered aeration apparatus 200, submersible aeration apparatus 300 as well. Recumbent generator 240 comprises direct current (DC) motor generator drives 28. Preferably, liquid medium flows past leading disc 181 forcing leading disc 181 to turn in the direction of liquid medium shown travelling in the direction of arrows 251 (FIG. 9) or arrow 51 (FIG. 8). Likewise, liquid medium flows past trailing disc 192 forcing trailing disc 192 to turn in the direction of liquid medium shown travelling in the direction of arrows 251 (FIG. 9) or arrow 51 (FIG. 8). Preferably recumbent generator 240 generates power from one or both leading disc 181 and/or trailing disc 192 rotations and utilizes the electric power generated by recumbent generator 240 to compensate for any lag occurring in either leading disc 181 and/or trailing disc 192 by powering drive 28 with electric power generated by recumbent generator 240, thus enabling synchronized or unsynchronized rotation of discs 60.

Land based power may be supplied to tethered aeration apparatus 200 along cable 228 or locally generated power may be generated by energy device 250. Energy generation device 250 may include, but is not limited to solar, wind, static electricity, photovoltaic, electric generator and/or storage batteries.

Figure 10:
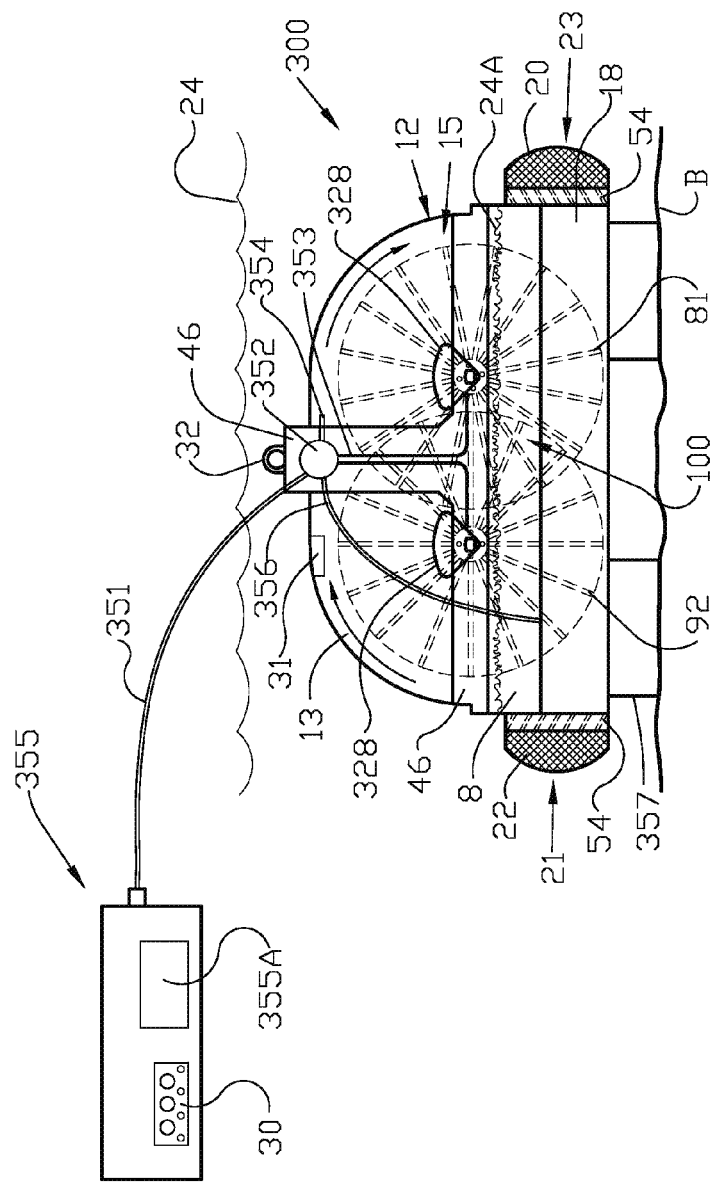
FIG. 10 is a side view of a submersible aeration apparatus with a remote umbilical power and control unit according to an example embodiment.

Referring now to FIG. 10, there is illustrated an example embodiment of a side view of submersible aeration apparatus 300 (with dashed lines illustrating multi-shaft intermeshed plurality of mixing discs 60 as shown in FIG. 4A) with remote umbilical power and control unit 355. Submersible aeration apparatus 300 functions and operates similar to aerator device 10 of FIGS. 1 and 2 having similar elements such as dome 12, liquid line 24, top portion 13, space or compartmental enclosure 15, frame 46, lower housing 18, opposing open sides 21 and 23, intake screen 20, discharge screen 22, vane 54, leading disc 81, trailing disc 92, mixing area 100, controller 30, environmental sensors 31, ballast 102 enabling a multi-shaft intermeshed plurality of mixing discs 60 operating under a submerged pressurized dome 12. It should be recognized that 'similar elements' for submersible aeration apparatus 300 may require additional strength, rigidity, durability and the like to operate when submersible aeration apparatus 300 is positioned at various submerged depths.

Preferably, submersible aeration apparatus 300 further comprises remote power and controller unit 355 a combination power supply 355A and controller 30. Remote power supply 355A is preferably any air compressor, whether positive displacement or dynamic, for compressing air (or other gases) capable of increasing the pressure of air by reducing its volume; thus, transporting the compressed air thru umbilical line 351 to submersible aeration apparatus 300. It is contemplated herein power supply 355A includes, but is not limited to, alternating current, direct current, compressed air, hydraulic and/or solar power capable of powering drive 28, reversible air motors 328, and/or submersible aeration apparatus 300. Umbilical line 351 is preferably any length tubing and/or wiring capable of transporting power and/or sensor/control data between remote power and control unit 355 and submersible aeration apparatus 300. It is recognized that having the ability to place remote power and control unit 355 remotely from submersible aeration apparatus 300 or aerator device 10 enables quiet, almost invisible, and self contained power and control at an environmentally safe distance from marine habitat.

Preferably, hub 352 receives compressed air from remote air source, power supply 355A via umbilical line 351 and regulates and distributes compressed air to enclosure 15, ballast 102, and reversible air motors 328. Hub 352, one or more switchable valves, is controlled by controller (includes electronics area, onboard computer, monitors, processor, storage, communications, data acquisition and transmission) and directs the necessary quantity of compressed air to reversible air motors 328 via pipe or tubing 353 to maintain the rotational drive velocity and direction of reversible air motors 328. Moreover, hub 352 selects the rotational direction of reversible air motors 328 enabling reverse rotation of reversible air motors 328. Alternatively, controller 30 may select the direction whether forward, reverse, and/or speed of each reversible air motors 328 by utilizing a switchable valve local to reversible air motors 328. By adjusting the speed of one reversible air motors 328 in relation to any other reversible air motors 328, controller 30 can be utilized to steer submersible aeration apparatus 300. Moreover, reverse direction of reversible air motors 328 allows for self cleaning of bleed holes 78, intake screen 20, as well as flushing out any sediment collecting in lower housing 18. In addition, hub 352 comprises one or more switchable valves, which directs an appropriate quantity of compressed air to enclosure 15 under dome 12; thus evacuating water from enclosure 15 similar to a divers bell.

Furthermore, hub 352 regulates and distributes compressed air to enclosure 15 via pipe or tubing 354 to evacuate the water from enclosure 15 under dome 12. Hub 352 regulates the level of fluid line 24A (fluid line, liquid line, and water line refers to the fluid line inside dome 12, which may be the same as the body of fluid surface line unless apparatus is submerged) within enclosure 15 under dome 12, like a diving bell. Thus, maintaining optimal operation of multi-shaft intermeshed plurality of mixing discs 60 operating above and beneath fluid line 24A under a submerged pressurized dome 12 at any depth. Preferably, hub 352 comprises one or more switchable valves, which directs an appropriate quantity of compressed air to regulate the level of fluid line 24A within enclosure 15.

Henry's law states that at a constant temperature, the amount of a given gas dissolved in a given type and volume of liquid is directly proportional to the partial pressure of that gas in equilibrium with that liquid. i.e., the amount of air dissolved in a fluid is proportional with the pressure. Expressed as a ratio: $c=k_h*p_g$ where c is the solubility of dissolved gas, where $k_h$ is the proportionality constant depending on the nature of the gas and the solvent, and where $p_g$ is the partial pressure of the gas. Therefore, with an increase in the partial pressure of the gas under dome 12 an increase in the solubility of the dissolved gas (oxygen) into the fluid (water) occurs within submersible aeration apparatus 300. As submersible aeration apparatus 300 descends the pressure under dome 12 increases resulting in an increased efficiency in dissolving gas (oxygen) into the fluid (water). For example, operating aerator device 10 or tethered aeration apparatus 200 on the surface of water line 24 may result in 5-15 parts per million (ppm) of dissolved gas (oxygen) into the fluid (water). Utilizing Henry's law and submerging submersible aeration apparatus 300 to depths having 10, 15, 20 or more atmospheres of pressure results in 30-50 parts per million (ppm) of dissolved gas (oxygen) into the fluid (water). Henry's law results in a direct correlation between pressure and suspendability of dissolved gas (oxygen) into the fluid (water). Therefore, the higher the pressure under dome 12 whether via submersing apparatus 300 to depth or increasing the pressure via blower 16 for device 10, device 100.1, and apparatus 200 a resulting increase in the rate of dissolved gas (oxygen) into the fluid (water) occurs for such device 10, device 100.1, apparatus 200, and apparatus 300.

Dissolved oxygen moves into and out of water by diffusion. The rate of diffusion depends on the difference in oxygen partial pressure between the liquid and gas phases—the greater the difference, the greater driving force moving oxygen from one phase to the other. Standard aeration efficiency (SAE) is the standard oxygen transfer rate divided by the power requirement in horsepower (hp). Units are pounds-$O_2$/hp-hour.

Moreover, submersible aeration apparatus 300 pulls water into opposing open side 23 through intake screen 20, into leading disc 81, which pulls gas depleted fluid into mixing area 100, and trailing disc 92 pushes air into mixing area 100, and thereafter trailing disc 92 pushes gas rich fluid through discharge screen 22 and out opposing open side 21. Preferably, intake screen 20 and discharge screen 22 prevent debris and marine life from entering submersible aeration apparatus 300.

While under additional pressure due to the depth of submersible aeration apparatus 300, strakes 70 on leading disc 81 captures liquid from the wastewater pond and carries it up into the mixing area 100. Strakes 70 on trailing disc 92 captures air from underneath dome 12 and carries it down into mixing area 100, in addition to pushing liquid down into mixing area 100. Discs 81 and 92 and their two strakes 70 moving in unison together create shear force F between the upward and downward moving liquid within the mixing area, resulting in shear force F that drives air into the oxygen depleted wastewater. Shearing force F occurs in oxygen rich mixing area 100 under pressure resulting in an increased transfer of oxygen into the liquid via Henry's Law.

Preferably, adjustable vanes 54 on opposing open sides 21 and 23 vector the water intake and discharge to assist in stabilizing submersible aeration apparatus 300 during operation. Furthermore, submersible aeration apparatus 300 comprises setting legs 357 of any length disposed on the underside of submersible aeration apparatus 300 or affixed to ballast 102. Preferably, legs 357 maintain submersible aeration apparatus 300 a determined distance above the bottom B of the body of water reducing sediment intake into screen 20, sediment erosion, marine life disruption and the like. It is recognized that legs 357 may be of any shape or configuration and include a foot or other broad surface area to prevent settling of submersible aeration apparatus 300 into the bottom B.

Figure 11:
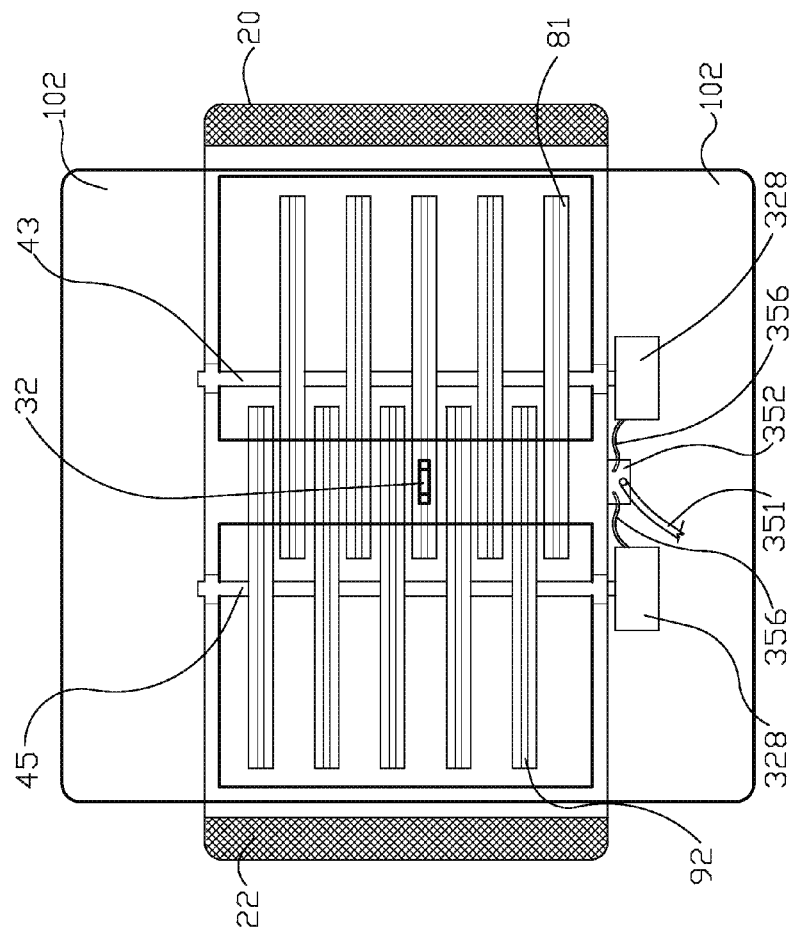
FIG. 11 is a top view of the submersible aeration apparatus of FIG. 11.

Referring now to FIG. 11, there is illustrated an example embodiment of a top view of submersible aeration apparatus 300 illustrating multi-shaft intermeshed plurality of mixing discs 60 as shown in FIG. 4B with dome removed. Again, submersible aeration apparatus 300 functions and operates similar to aerator device 10 of FIGS. 1 and 2 having similar elements such as frame 46, opposing open sides 21 and 23, intake screen 20, discharge screen 22, leading disc 81, trailing disc 92, ballast 102, leading shaft 43, trailing shaft 45, enabling a multi-shaft intermeshed plurality of mixing discs 60 operating under a submerged pressurized dome 12 (not shown). It should be recognized that 'similar elements' for submersible aeration apparatus 300 may require additional strength, rigidity, durability and the like to operate when submersible aeration apparatus 300 is positioned at various submerged depths. Preferably, submersible aeration apparatus 300 further comprises reversible air motors 328, umbilical line 351, hub 352, pipe or tubing 353.

Leading drive 42 (shown as reversible air motors 328) is connected to leading shaft 43 and one or more disc 60 (shown as leading disc assemblies 81 and the like) are preferably affixed to leading shaft 43. Trailing drive 44 (shown as reversible air motors 328) is connected to trailing shaft 45 and one or more disc 60 (shown as trailing disc assemblies 92 and the like) are preferably affixed to trailing shaft 45. The leading and trailing disc assemblies are placed in parallel, with their properly spaced discs placed in an overlapping, interlaced relation for dissolving gas into a fluid under liquid line 24, and preferably at depth under increased pressure.

Ballast 102 may preferably be used to retrieve or position submersible aeration apparatus 300, or for height/depth adjustment and position of submersible aeration apparatus 300 in relation to bottom B or liquid line 24 by increasing/decreasing the quantity of air in ballast 102. To raise submersible aeration apparatus 300, controller 355, hub 352, and pipe or tubing 356 preferably enable air from remote power supply 355A via umbilical line 351 to enter ballast 102, thus, making submersible aeration apparatus 300 buoyant. To lower submersible aeration apparatus 300, controller 355, hub 352, and pipe or tubing 356 preferably enable air from ballast 102 to evacuate ballast 102, thus, making submersible aeration apparatus 300 less buoyant. It is recognized that submersible aeration apparatus 300 may be tethered as shown in FIG. 9.

Figure 12:
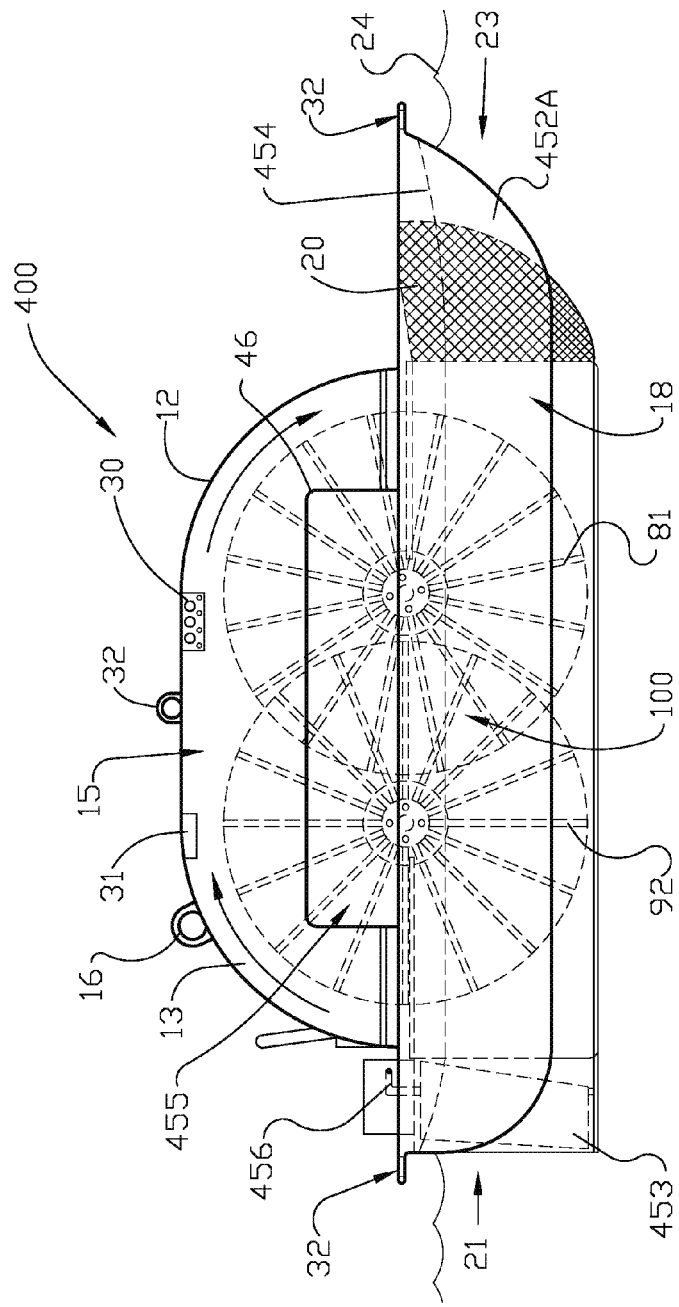
FIG. 12 is a side view of a self contained aeration apparatus with a catamaran hull according to an example embodiment.

Referring now to FIG. 12, there is illustrated an example embodiment of a side view of self contained aeration apparatus 400 (with dashed lines illustrating multi-shaft intermeshed plurality of mixing discs 60 as shown in FIG. 4A) with a catamaran hull 452. Self contained aeration apparatus 400 functions and operates similar to aerator device 10 of FIGS. 1 and 2 and submersible aeration apparatus 300 of FIGS. 10 and 11 having similar elements such as dome 12, liquid line 24, top portion 13, space or compartmental enclosure 15, frame 46, lower housing 18, blower 16, opposing open sides 21 and 23, intake screen 20, leading disc 81, trailing disc 92, mixing area 100, controller 30, environmental sensors 31, eye 32 (utilized for lifting, air lifting, towing, tethering and the like), frame 46 enabling a multi-shaft intermeshed plurality of mixing discs 60 operating under pressurized dome 12.

Preferably, self contained aeration apparatus 400 further comprises hull 452 a combination boat hull or flotation hull and fuel cell or fuel tank. Hull 452 is preferably a catamaran style boat hull with flotation devices 452 A&B configured on each side of multi-shaft intermeshed plurality of mixing discs 60. Hull 452 creates buoyancy for self contained aeration apparatus 400. It is recognized that hull 452 of self contained aeration apparatus 400 may be any flotation hull configuration capable of floating multi-shaft intermeshed plurality of mixing discs 60 and enabling liquid to enter and exit mixing area 100 within lower housing 18.

Furthermore, hull 452 is utilized as a storage tank or fuel tank 454 to store fuel for operation of power plant 455 (whether mechanical, hydraulic, electrical, compressed air or the like) of self contained aeration apparatus 400, including power requirements for leading drive 42, trailing drive 44 (drives may be mechanical, hydraulic, electrical compressed air or the like), controller 30, blower 16, and environmental sensors 31.

Preferably, self contained aeration apparatus 400 comprises steering control 456 and rudders 453. Steering control 456 and rudders 453 are utilized to direct discharged fluid from leading disc 81 and trailing disc 92 exiting lower housing 18 at open side 21 to steer hull 452 of self contained aeration apparatus 400. Rudders 453 extend below liquid line 24 at open side 21 of hull 452 and function to steer hull 452 of self contained aeration apparatus 400 when vectored discharge from leading disc 81 and trailing disc 92 discharges across rudders 453 for directional control of self contained aeration apparatus 400. It is recognized that leading disc 81 and trailing disc 92 may be used to propel hull 452 of self contained aeration apparatus 400 under the control of steering control 456 and rudders 453 eliminating cable and power tethers required for tethered aeration apparatus 200. Alternatively, self contained aeration apparatus 400 may be tethered at eye 32 proximate the front of hull 452 and operated as a stationary self contained aeration apparatus.

Figure 13:
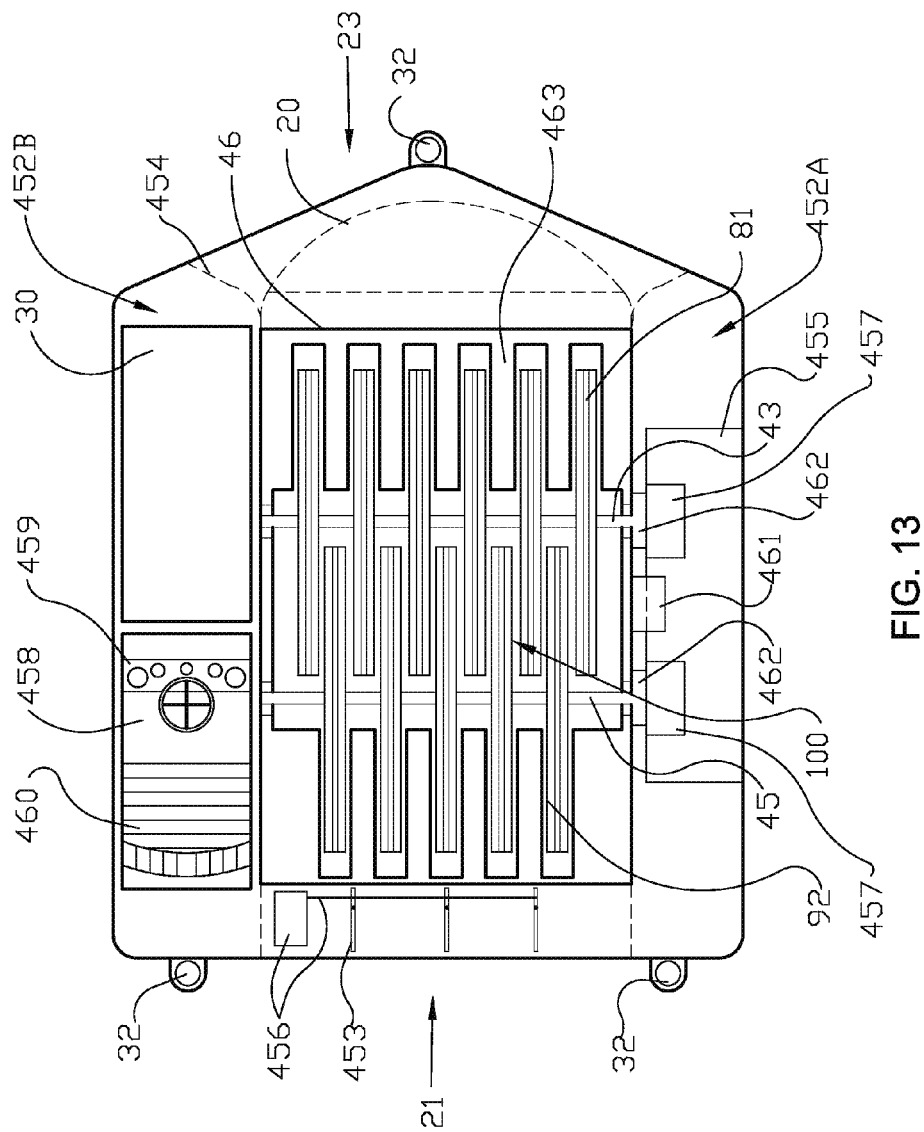
FIG. 13 is a top view of the self contained aeration apparatus of FIG. 12.

Referring now to FIG. 13, there is illustrated an example embodiment of a top view of self contained aeration apparatus 400 illustrating multi-shaft intermeshed plurality of mixing discs 60 as shown in FIG. 4B with dome removed. Again, submersible aeration apparatus 300 functions and operates similar to aerator device 10 of FIGS. 1 and 2 having similar elements such as frame 46, eye 32, opposing open sides 21 and 23, intake screen 20, leading disc 81, trailing disc 92, mixing area 100, ballast 102, power plant 455, leading shaft 43, trailing shaft 45, drives 28, steering control 456, rudders 453, fuel tank 454, controller 30 (includes electronics area, onboard computer, monitors, processor, storage, communications, data acquisition and transmission) enabling a multi-shaft intermeshed plurality of mixing discs 60 operating under a pressurized dome 12 (not shown). Moreover, a cutter head may be positioned proximate open side 23 to eradicate, remove, or harvest duck weed, algae or other aquatic plant growth. Still further, self contained aeration apparatus 400 may comprise operator station 458, control panel 459, and seating 460 for manual operation and control of self contained aeration apparatus 400 or self contained aeration apparatus 400 may operate autonomously utilizing positioning system or pre-programmed control.

Preferably, self contained aeration apparatus 400 further comprises transmission 457, a gear system for transmitting mechanical power from or drives 28 to leading shaft 43, trailing shaft 45. Furthermore, transmission 457 comprises shaft de-coupler 462 enabling decoupling of transmission 457 from power plant 455. Alternatively, de-coupler 462 may couple transmission 457 to recumbent generator 240 for gathering energy when towing self contained aeration apparatus 400 through the water or by tethering self contained aeration apparatus 400 while tidal current or river flow rotates leading disc 81 and the energy gathered from leading disc 81 is transferred to trailing disc 92 via recumbent generator 240.

Furthermore, rotor baffles 463 positioned proximate opposing open sides 21 and 23, more specifically extending between leading discs 81 on open sides 23 and between trailing disc 92 on open side 21 for reducing wash or splash into self contained aeration apparatus 400 when in motion or tethered in heavy wave conditions.

Moreover, self contained aeration apparatus 400 further comprises hull 452A and 452B a catamaran style boat hull with flotation devices 452A and 452B configured on each side of multi-shaft intermeshed plurality of mixing discs 60 to create a center tunnel starting with open side 23, intake screen 20, lower housing 18 (shown in FIG. 12), and open side 21.

It is recognized that self contained aeration apparatus 400 may comprise instantiated units operating in combination like a floating dissolved gas (oxygen) into the fluid (water) barge. Such barge may be towed or propelled up and down a waterway, harbors, sounds and the like to eradicate large dissolved oxygen problems. In addition, this barge can be stored in a regular barge docking facility or anchor.

It is further recognized that self contained aeration apparatus 400 may be relatively small such as seven rotors, 40 horse power plant, and approximately 10 feet in length enabling transport to bodies of water that are being stressed by algae blooms, sewage spills, and the like and can benefit from quick restoration of dissolved gas (oxygen) into the fluid (water).

It is still further recognized that enclosed floating dome aerator device 10, mechanical agitation of aerator device 100.1, tethered aeration apparatus 200, submersible aeration apparatus 300, and self contained aeration apparatus 400 may comprise any number of leading discs 81, trailing disc 92, leading shaft 43, trailing shaft 45, rotor designs shown in FIG. 3 (whether for efficient transfer of dissolved gas (oxygen) into the fluid (water), to match the medium fluid (water), to operate with chop suspended solids or chop fibrous material suspended in fluid (water)), instantiated units operating in combination and the like.

Figure 14:
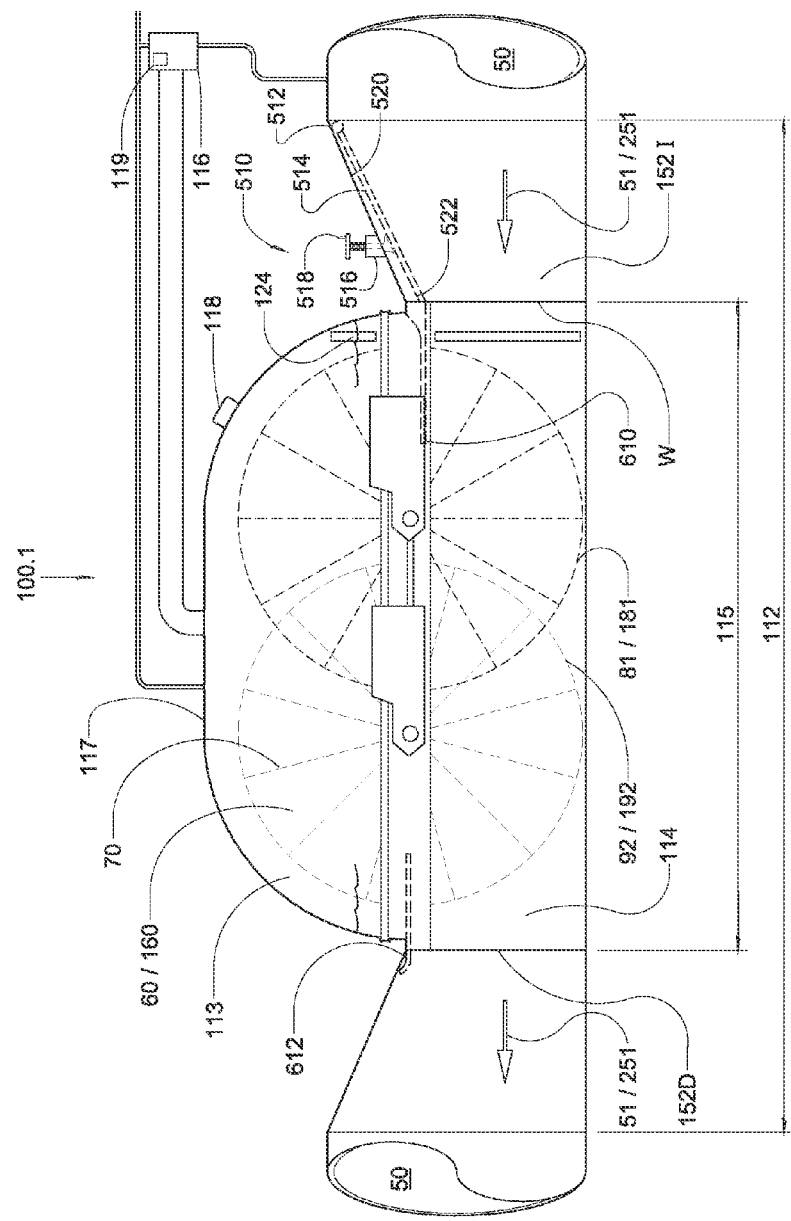
FIG. 14 is a cross section of the pipe or closed receptacle and enclosure in FIG. 7 with an aeration apparatus of FIG. 8 housed in the enclosure according to an example embodiment.

Referring now to FIG. 14 is illustrated an example embodiment of a fully enclosed in-line pipe or closed receptacle aerator device 100.1 as shown in FIG. 8. In-line pipe aerator device 100.1 preferably includes tapered adapter end 152I affixing compartment 115 to the input flow from pipe 50 and tapered adapter end 152D affixing compartment 115 to the output flow to pipe 50. Enclosure 112 and compartment 115 preferably are welded W to discharge pipe's 50 to form a sealed and continuous enclosure 112 between ends of pipe 50; however, it should be recognized that various other methods for affixing enclosure 112 and compartment 115, to tapered adapter ends 152, and for affixing tapered adapter ends 152 to pipe 50 may alternatively be utilized. Moreover, it is contemplated that compartment 115 may be affixed directly to pipe 50 without the need for tapered adapter ends 152I/152D as shown in FIG. 8.

Preferably, in-line pipe aerator device 100.1 includes trailing disc wipe 612 (similar to rotor baffles 463 of FIG. 13) interleaved between strakes 70 of trailing discs 92/192 to maximize liquid flow from mixing area 100 back into pipe 50. Trailing disc wipes 612 preferably channel liquid being discharged up into upper section 113 of compartment 115 by strakes 70 on the trailing discs 92/192 and channel the liquid from lower section 114 of compartment 115 into tapered adapter end 152D and finally to exit therefrom into pipe 50. Moreover, trailing rotor wipe 612 reduces spray and thrown liquid from travelling from lower section 114 of compartment 115 to upper section 113 of compartment 115 when trailing discs 92/192 are in motion.

Preferably, in-line pipe aerator device 100.1 includes leading disc wipe 610 (similar to rotor baffles 463 of FIG. 13) interleaved between strakes 70 of leading discs 81/181 to maximize pull of liquid flow from pipe 50 into the mixing area 100. Leading disc wipes 610 preferably channel the liquid discharged from pipe 50, to tapered adapter end 152I and finally into lower section 114 of compartment 115, thus reducing the up swell of liquid up into upper section 113 of compartment 115 and maximizing the liquid being captured by strakes 70 of leading discs 81/181. Moreover, leading rotor wipe 610 reduces discharge of incoming liquid travelling from pipe 50 (and tapered adapter end 152I) attempting to discharge from lower section 114 of compartment 115 to upper section 113 of compartment 115 when leading discs 81/181 are in motion.

Air source, such as blower/compressor 16/116, is preferably any common industrial variable speed rotary type blower. Blower 16/116 can be of any standard design with air flow and pressure ratings capable of increasing the barometric pressure of the air under dome 12/117 (upper section 113 of compartment 115) to preferably between approximately 35-40 inches of mercury or 1-3 psi, however, greater or lesser barometric pressure can be utilized depending on the gas and liquid medium being mixed, the pressure of liquid flow 51/251 form pipe 50, and the desired liquid line 124. It is contemplated herein that blower/compressor 16/116 will maintain an air environment in upper section 113 of compartment 115 and may be utilized to regulate the ratio of upper section 113 to lower section 114 of compartment 115. It is contemplated herein that blower/compressor 16/116 will maintain an air environment in upper section 113 of compartment 115 at or above the pressure of liquid flow 51/251 form pipe 50 with the desire to optimize Henrys Law (maximize the gas dissolve or suspended in the liquid).

Referring now to FIG. 15 is illustrated an example embodiment of a cross section of the pipe or closed receptacle and enclosure in FIG. 14 displaying the hydrodynamics of liquid flowing through in-line pipe aerator device 100.1 including input swells 540, exit swells 542 and dynamics of the liquid gas mixing area 100.

Referring again to FIG. 14, in-line pipe aerator device 100.1 preferably includes adjustable nozzle plate 500 housed in tapered adapter end 152I for altering the entry angle of arrow 51 of liquid entering lower section 114 of compartment 115. It is contemplated herein that nozzle 500 may be positioned approximate compartment 115 or within pipe 50. Furthermore, it is contemplated herein that nozzle 500 may be configured with a contour surface to efficiently adjust the angle of arrow 51 of liquid entering lower section 114 of compartment 115 to maximize the force of liquid flow being captured by strakes 70 of leading discs 81/181. Preferably, nozzle plate 500 includes pivot point 512 radially affixed to a first end 520 of nozzle plate 500 which enables nozzle plate 500 to pivot about pivot point 512 altering the entry angle of arrow 51 of liquid entering lower section 114 of compartment 115. By nozzle plate 500 reflecting arrow 51 of liquid entering compartment 115 down toward the bottom of pipe 50 the force of liquid flow into lower section 114 of compartment 115 is efficiently captured by strakes 70 on the leading discs 81/181; thus, causing leading discs 81/181 to rotate. Moreover, nozzle plate 500 includes adjustment knob 518 screwed through nut 516 affixed to surface 510 of tapered adapter end 152I and radially affixed to nozzle plate 500. Preferably knob 518 is adjusted in and out of nut 516; thus, increasing and decreasing, respectively, the reflection angle of arrow 51 of liquid entering lower section 114 of compartment 115.

It is contemplated herein that leading disc wipe 610 and/or adjustable nozzle plate 500 operate in combination, as a single unit, are utilized to maximize liquid flow from pipe 50 into the mixing area 100 and maximize the capture of force from liquid flow into lower section 114 of compartment 115.

It is contemplated herein that leading disc wipe 610 and/or adjustable nozzle plate 500 operate to direct the angle of liquid flow in a direction that aids in the rotation of leading discs 81/181 optimizing the capture of energy from the liquid flow, to flatten or optimize the shape of the liquid medium, to add velocity to the liquid medium, and to optimize the shape and direction of the liquid medium.

It is further contemplated herein that in-line pipe aerator device 100.1 may be operated at varying pressure and flow rates to maximize liquid and gas integration and to maximize the rate gas is suspended in the liquid.

Referring now to FIG. 16.1 is illustrated a partial end view of an exemplary radial strake with bleed holes functioning similar to FIGS. 3 and 5. Strake 70 preferably is configured using two channel bars or one I-beam (leading channel and trailing channel) and is generally u-shaped; however, other shapes are contemplated herein. Strake 70 has an open leading face 74 (leading channel) and an open trailing face 75 (trailing channel) wherein faces 74 and 75 preferably extend lengthwise along strake 70 forming peripheral edges of a channel for strake 70 to carry liquid and/or gas. Preferably, open leading face 74 has on one end mounting face 76 and on the other end has generally a rectangle shaped end cap 72 forming a trough to carry liquid and/or gas. Additionally, strake 70 preferably has a plurality of bleed holes 78 defined through exterior sidewall 79 of open leading face 74. Alternatively, open trailing face 75 has on one end mounting face 76 and on the other end is open to maximize energy capture.

Referring now to FIG. 16.2 is illustrated a partial side view of a radial strake of FIG. 16.1 with bleed holes and energy capture members 77 according to another example embodiment. Preferably, open trailing face 75 includes acute angled energy capture members 77 for capturing the energy or force from liquid flow travelling from pipe 50 into lower section 114 of compartment 115 wherein such force is exerted against the back side of strake 70 (trailing face 75). Energy capture members 77 are preferably spaced radial from the center of disc 60 to its outer circumference and angled at an acute angle relative to bottom sidewall wall 73 of open trailing face 75. Position and angle of energy capture member 77 may be varied in size, shape, angle, and placement to maximize aerator device 10/100.1 energy capture efficiency and dissolved gas transfer rate in any liquid medium.

Figure 17:
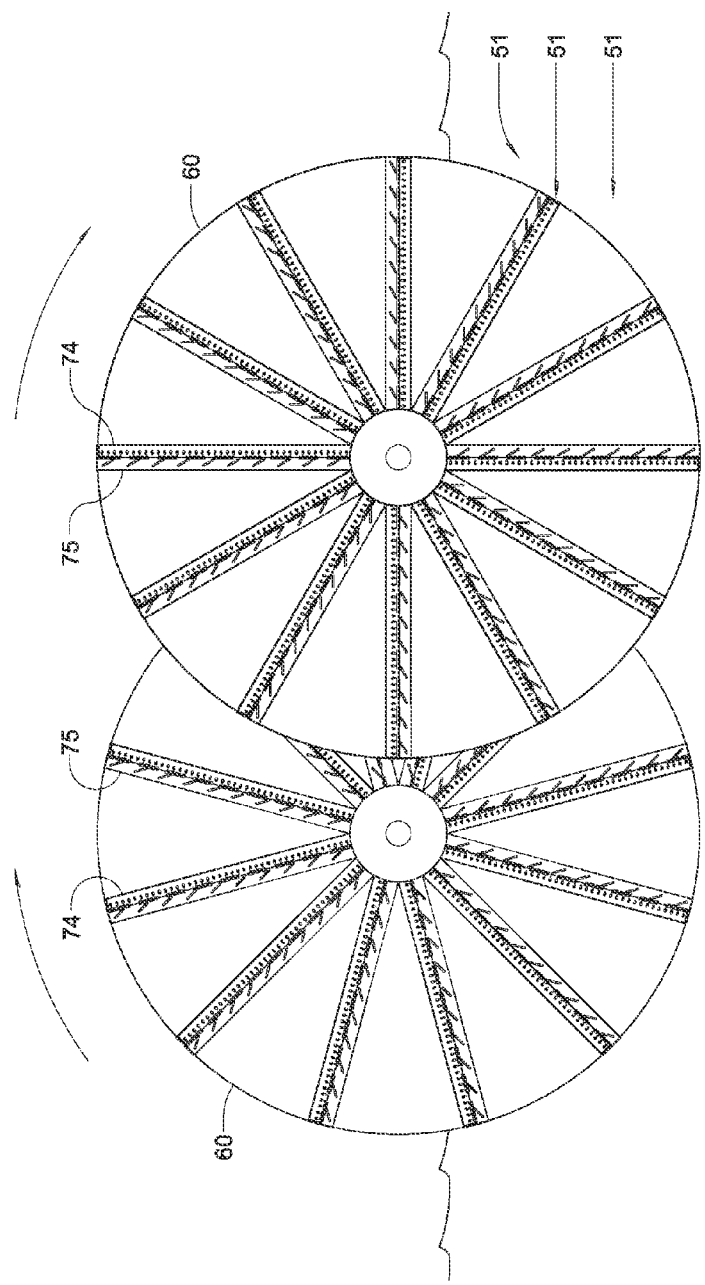
FIG. 17 is front sectional view of a pair of discs having strakes shown in FIG. 16 and showing their direction of rotation and direction of liquid flow according to an example embodiment.

Referring now to FIG. 17 is front sectional view of a pair of discs having strakes shown in FIG. 16 and showing their direction of rotation and direction of liquid flow according to an example embodiment, where the position and angle of energy capture strakes 77 of open trailing face 75 are set at acute angles to capture energy from liquid flow exerted against the back side of strake 70.

It is contemplated herein that pipe 50 includes, but is not limited to, conduit, tube, enclosed vessel or receptacle and the like.

Figure 18:
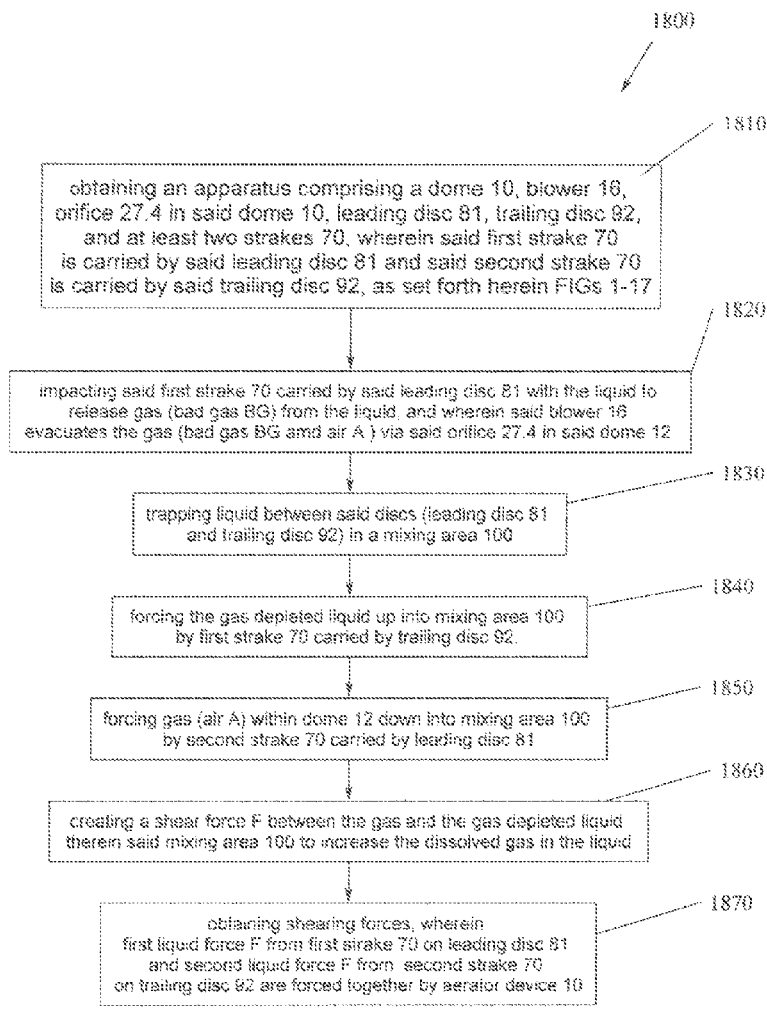
FIG. 18 is a flow diagram of a method of controlled scrubbing, ventilation, and aeration of a liquid medium.

Referring now to FIG. 18 there is illustrated a flow diagram 1800 of a method of controlled ventilation, scrubbing, and aeration of a liquid medium LM. In block or step 1810, obtaining an apparatus comprising dome 12, blower 16, orifice 27.4 in said dome 12, leading disc 81, trailing disc 92, and at least two strakes 70, wherein first strake 70 is carried by leading disc 81 and second strake 70 is carried by trailing disc 92 under pressurized or pressure differential dome 12. In block or step 1820, preferably first strake 70 carried by leading disc 81 rotates and impacts liquid medium LM, such impact causes liquid medium LM to extract or release bad gas BG from the liquid medium LM, and wherein blower 16 evacuates or pushes such bad gas BG and air A through orifice 27.4 out of dome 12. Moreover, liquid medium LM overladen with bad gas BG has been scrubbed or purged of a portion or substantial portion of bad gas BG and is in a prepared condition to accept, feed, or intake oxygen or air A in mixing area 100. Such step increases the efficiency of the liquid medium to accept, feed, or intake of oxygen or air A in mixing area 100 by making space available in liquid medium for intake of oxygen or air A. Still further when blower 16 pressurizes dome 12 and blower 16 evacuates such bad gas BG and air A through orifice 27.4 out of dome 12 liquid medium is preferably exposed to air A without any pockets of bad gas BG. In block or step 1830, trapping liquid between said discs (leading disc 81 and trailing disc 92) in a mixing area 100. In block or step 1840, forcing, carrying, or pushing the gas depleted liquid up into mixing area 100 by first strake 70 carried by trailing disc 92. In block or step 1850, forcing, carrying, or pushing gas within dome 12 down into mixing area 100 by second strake 70 carried by leading disc 81. In block or step 1860, creating a shear force F between the gas and the gas depleted liquid, liquid medium LM therein said mixing area 100 to increase the dissolved gas in the liquid medium LM. In block or step 1870, obtaining shearing forces, wherein first liquid force F from first strake 70 on leading disc 81 and second liquid force F from second strake 70 on trailing disc 92 are forced together by aerator device 10 to increase the dissolved gas in the liquid medium LM.

Figure 19:
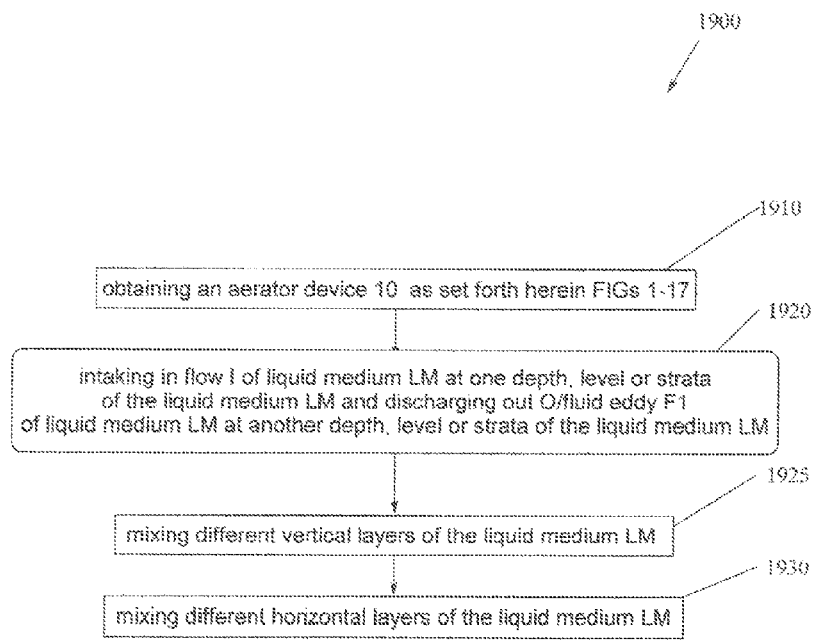
FIG. 19 is a flow diagram of a method of aeration of liquid medium and vectoring flow control of a liquid medium in a pond.

Referring now to FIG. 19 there is illustrated a flow diagram 1900 of a method of aeration of liquid medium and vectoring flow control. In block or step 1910, obtaining an aerator device 10 having dome 12 supported by flotation device 14, lower housing 18 supported by flotation device 14, lower housing 18 preferably connected to dome 12, wherein a space, such as compartmental enclosure 15 is defined under dome 12 and above interior liquid 25, aeration apparatus is preferably positioned within compartmental enclosure 15 and partially submerged in interior liquid 25, wherein aeration apparatus includes one or more parallel shafts 43/45, at least one first disc 81 positioned axially on one of shafts 43/45, at least one second disc 92 positioned axially on another of shafts 43/45, wherein second disc 92 is interleaved relative to first disc 81, and wherein a surface of first disc 81 rotates in a direction opposite a surface of second disc 92 relative to each other resulting in a mixing area 100 therebetween, open side 21 configured to intake in flow I of liquid medium LM at depth DI, and open side 23 configured to discharge out flow O of liquid medium LM at depth DD below depth DI (vice-a-versa), in flow I of liquid medium LM into intake or open side 21 of aerator device 10, an out flow O of liquid medium LM discharged from open side 23 or discharge chute 140 of aerator device 10, and wherein said out flow O from said aerator device is configured as a plurality of flow vectors F originating at open side 23 or discharge chute 140 and returning to intake or open side 21 to form torus shaped wave in pond P, defined as first rotating liquid medium LM1 or starboard flow vector SB and second rotating liquid medium LM2 or port flow vector PT. In block or step 1920, intaking in flow I of liquid medium LM at one depth, level or strata of the liquid medium LM and discharging out O/fluid eddy F1 of liquid medium LM at another depth, level or strata of the liquid medium LM. In block or step 1925, mixing different vertical layers of the liquid medium LM. In block or step 1920, mixing different horizontal layers of the liquid medium LM.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

What is claimed is:

1. An apparatus for controlled ventilation and aeration of a liquid medium, the apparatus comprising:
   a) a dome supported by a flotation device;
   b) a lower housing supported by said flotation device, said lower housing connected to said dome, wherein a sealed space is defined under said dome and above the flotation liquid;
   c) an aeration apparatus positioned within said sealed space and partially submerged in the flotation liquid, wherein said aeration apparatus comprises one or more parallel shafts, at least one first disc positioned axially on one of said shafts, at least one second disc positioned axially on another of said shafts, wherein said second disc is interleaved relative to said first disc, and wherein a surface of said first disc rotates in a direction opposite a surface of said second disc relative to each other resulting in a mixing area therebetween; and
   d) a discharge chute configured to discharge the liquid medium.

2. The apparatus of claim 1, wherein said discharge chute is contoured.

3. The apparatus of claim 2, wherein the liquid medium is discharged from said discharge chute at a depth below a surface level of the liquid medium.

4. The apparatus of claim 3, further comprising an intake screen.

5. The apparatus of claim 4, wherein said intake screen is further comprises a pivot device disposed on one end of said intake screen.

6. The apparatus of claim 5, wherein said intake screen is angularly adjustable.

7. The apparatus of claim 5, wherein said discharge chute discharges the liquid medium at a depth below said intake screen.

8. The apparatus of claim 7, further comprising an in flow and an out flow, wherein said inflow of the liquid medium is configured for a first depth below said surface level of the liquid medium and said out flow is configured for a second depth below said surface level of the liquid medium.

9. The apparatus of claim 8, wherein said first depth is below said second depth.

10. The apparatus of claim 8, wherein said first depth and said second depth are configured to mix different horizontal layers of the liquid medium.

11. The apparatus of claim 7, said discharge chute further comprising a flow direction device configured to enable variable direction of out flow of the liquid medium.

12. The apparatus of claim 11, wherein said discharge chute directs out flow to a specific depth of the liquid medium.

13. A system for mixing a liquid medium, the system comprising:
    an aerator device having a dome supported by a flotation device, a lower housing supported by said flotation device, said lower housing connected to said dome, wherein a sealed space is defined under said dome and above the flotation liquid, an aeration apparatus positioned within said sealed space and partially submerged in the flotation liquid, wherein said aeration apparatus comprises one or more parallel shafts, at least one first disc positioned axially on one of said shafts, at least one second disc positioned axially on another of said shafts, wherein said second disc is interleaved relative to said first disc, and wherein a surface of said first disc rotates in a direction opposite a surface of said second disc relative to each other resulting in a mixing area therebetween, an intake configured to intake the liquid medium, and a discharge configured to discharge the liquid medium;
    an in flow of the liquid medium into said intake;
    an out flow of the liquid medium from said discharge; and
    wherein said out flow from said aerator device is configured as a plurality of flow vectors originating at said discharge and returning to said intake.

14. The system of claim 13, wherein said discharge further comprising a discharge chute.

15. The system of claim 14, wherein said discharge chute discharges the liquid medium at a depth below said intake.

16. The system of claim 13, wherein said out flow and said in flow are configured as a torus shape.

17. The system of claim 13, wherein said out flow and said in flow are configured as a starboard flow vector.

18. The system of claim 17, wherein said starboard flow vector generates a first rotating liquid medium.

19. The system of claim 18, wherein said first rotating liquid medium is configured to mix different vertical layers of the liquid medium.

20. The system of claim 18, wherein said first rotating liquid medium is configured to rotate counter-clockwise.

21. The system of claim 13, wherein said out flow and said inflow are configured as a port flow vector.

22. The system of claim 21, wherein said port flow vector generates a second rotating liquid medium.

23. The system of claim 22, wherein said second rotating liquid medium is configured to mix different vertical layers of the liquid medium.

24. The system of claim 22, wherein said second rotating liquid medium is configured to rotate clockwise.

25. A method of mixing and aerating a liquid medium, comprising the steps of:
    a) obtaining an aerator device having a dome supported by a flotation device, a lower housing supported by said flotation device, said lower housing connected to said dome, wherein a space is defined under said dome and above the flotation liquid, an aeration apparatus positioned within said space and partially submerged in the flotation liquid, wherein said aeration apparatus comprises one or more parallel shafts, at least one first disc positioned axially on one of said shafts, at least one second disc positioned axially on another of said shafts, wherein said second disc is interleaved relative to said first disc, and wherein a surface of said first disc rotates in a direction opposite a surface of said second disc relative to each other resulting in a mixing area therebetween, an intake configured to intake an in flow of the liquid medium, and a discharge configured to discharge an out flow of the liquid, and wherein said out flow from said aerator device is configured as a plurality of flow vectors originating at said discharge and returning to said intake;
    b) operating said aerator device in the liquid medium; and
    c) generating said out flow and said in flow configured as a first rotating liquid medium and second rotating liquid medium.

26. The method of claim 25, wherein said first rotating liquid medium further comprises a starboard flow vector.

27. The method of claim 25, wherein said second rotating liquid medium further comprises a port flow vector.

28. The method of claim 25, further comprising the step of mixing different vertical layers of the liquid medium.

29. The method of claim 25, wherein said discharge of said aerator device further comprises a discharge chute.

30. The method of claim 29, wherein said discharge chute discharges at a depth below said intake.

31. The method of claim 29, wherein said discharge chute discharges at a depth above said intake.

32. The method of claim 30, further comprising the step of mixing different horizontal layers of the liquid medium.

33. The method of claim 25, wherein said a first rotating liquid medium and second rotating liquid medium are configured as a torus shape.

* * * * *